US012039329B2

(12) United States Patent
Wong et al.

(10) Patent No.: US 12,039,329 B2
(45) Date of Patent: Jul. 16, 2024

(54) METHODS, SYSTEMS, AND APPARATUSES TO OPTIMIZE PARTIAL FLAG UPDATING INSTRUCTIONS VIA DYNAMIC TWO-PASS EXECUTION IN A PROCESSOR

(71) Applicant: Intel Corporation, Santa Clara, CA (US)

(72) Inventors: Wing Shek Wong, Austin, TX (US); Vikash Agarwal, Austin, TX (US); Charles Vitu, Austin, TX (US); Mihir Shah, Austin, TX (US)

(73) Assignee: Intel Corporation, Santa Clara, CA (US)

( * ) Notice: Subject to any disclaimer, the term of this patent is extended or adjusted under 35 U.S.C. 154(b) by 610 days.

(21) Appl. No.: 17/134,108

(22) Filed: Dec. 24, 2020

(65) Prior Publication Data

US 2022/0206792 A1   Jun. 30, 2022

(51) Int. Cl.
*G06F 9/24* (2006.01)
*G06F 9/22* (2006.01)
*G06F 9/30* (2018.01)

(52) U.S. Cl.
CPC .......... *G06F 9/223* (2013.01); *G06F 9/30145* (2013.01)

(58) Field of Classification Search
CPC .............................. G06F 9/223; G06F 9/30145
See application file for complete search history.

(56) References Cited

U.S. PATENT DOCUMENTS

| 6,367,070 | B1 * | 4/2002 | Haghighat | G06F 8/452 717/160 |
| 8,484,444 | B2 * | 7/2013 | Pechanek | G06F 9/3877 712/225 |

(Continued)

FOREIGN PATENT DOCUMENTS

| EP | 3716057 A1 | 9/2020 | |
| JP | 6469120 B2 * | 2/2019 | ........... G06F 9/3001 |
| JP | 7124670 B2 * | 8/2022 | .......... G06F 11/0772 |

OTHER PUBLICATIONS

Office Action, EP App. No. 21197300.3, dated Jan. 19, 2023, 5 pages.

(Continued)

*Primary Examiner* — Cheng Yuan Tseng
(74) *Attorney, Agent, or Firm* — NICHOLSON DE VOS WEBSTER & ELLIOTT LLP

(57) ABSTRACT

Systems, methods, and apparatuses relating to circuitry to implement dynamic two-pass execution of a partial flag updating instruction in a processor are described. In one embodiment, a hardware processor core includes a decoder circuit to decode instructions into a set of one or more micro-operations, an execution circuit to execute the micro-operations decoded for the instructions, a data register to store data, a flag register to store a plurality of flags, and a reservation station circuit coupled between the decoder circuit and the execution circuit, the reservation station circuit to, in response to an indicator bit set to a multiple pass mode for a single micro-operation in a reservation station entry, perform a first dispatch of the single micro-operation to the execution circuit, when a source data operand in the data register is ready for execution and a source flag operand in the flag register is not ready for execution, to generate a data resultant, and a second dispatch of the single micro-operation to the execution circuit when both the source data (Continued)

operand in the data register and the source flag operand in the flag register are ready for execution to generate a flag resultant based on one or more of the plurality of flags in the flag register.

24 Claims, 16 Drawing Sheets

(56) References Cited

U.S. PATENT DOCUMENTS

| | | | |
|---|---|---|---|
| 8,516,223 B2* | 8/2013 | Fusejima | G06F 9/3836 |
| | | | 712/E9.071 |
| 10,255,076 B2* | 4/2019 | Abdallah | G06F 9/3838 |
| 10,768,934 B2* | 9/2020 | Grocutt | G06F 9/30072 |
| 10,776,124 B2* | 9/2020 | Gabrielli | G06F 9/3001 |
| 2022/0206792 A1* | 6/2022 | Wong | G06F 9/3836 |

OTHER PUBLICATIONS

Afzal et al., "Motorola PowerPc(trademark) Migration Tools—Emulation and Translation", COMPCON '96: Proceedings of the 41st IEEE International Computer Conference, Feb. 25, 1996, pp. 145-150.
European Search Report and Search Opinion, EP App. No. 21197300.3, dated Mar. 14, 2022, 11 pages.
Office Action, EP App. No. 21197300.3, Mar. 20, 2024, 8 pages.

* cited by examiner

800

```
┌─────────────────────────────────────────────────────────────────────┐
│ DECODING INSTRUCTIONS INTO A SET OF ONE OR MORE MICRO-OPERATIONS BY A│
│ DECODER CIRCUIT OF A PROCESSOR COMPRISING AN EXECUTION CIRCUIT AND A │
│                FLAG REGISTER TO STORE A PLURALITY OF FLAGS           │
│                                  802                                 │
└─────────────────────────────────────────────────────────────────────┘
                                    │
                                    ▼
┌─────────────────────────────────────────────────────────────────────┐
│ SETTING AN INDICATOR BIT TO A MULTIPLE PASS MODE FOR A SINGLE MICRO- │
│ OPERATION IN A RESERVATION STATION ENTRY OF A RESERVATION STATION    │
│ CIRCUIT COUPLED BETWEEN THE DECODER CIRCUIT AND THE EXECUTION CIRCUIT│
│                                  804                                 │
└─────────────────────────────────────────────────────────────────────┘
                                    │
                                    ▼
┌─────────────────────────────────────────────────────────────────────┐
│ IN RESPONSE TO THE INDICATOR BIT BEING SET TO THE MULTIPLE PASS MODE │
│ FOR THE SINGLE MICRO-OPERATION IN THE RESERVATION STATION ENTRY,     │
│ PERFORMING A FIRST DISPATCH OF THE SINGLE MICRO-OPERATION TO THE     │
│ EXECUTION CIRCUIT FROM THE RESERVATION STATION CIRCUIT, WHEN A       │
│ SOURCE DATA OPERAND IS READY FOR EXECUTION AND A SOURCE FLAG OPERAND │
│ IN THE FLAG REGISTER IS NOT READY FOR EXECUTION, TO GENERATE A DATA  │
│ RESULTANT, AND A SECOND DISPATCH OF THE SINGLE MICRO-OPERATION TO THE│
│ EXECUTION CIRCUIT WHEN THE SOURCE FLAG OPERAND IN THE FLAG REGISTER  │
│ IS READY FOR EXECUTION TO GENERATE A FLAG RESULTANT BASED ON ONE OR  │
│          MORE OF THE PLURALITY OF FLAGS IN THE FLAG REGISTER         │
│                                  806                                 │
└─────────────────────────────────────────────────────────────────────┘
```

FIG. 8

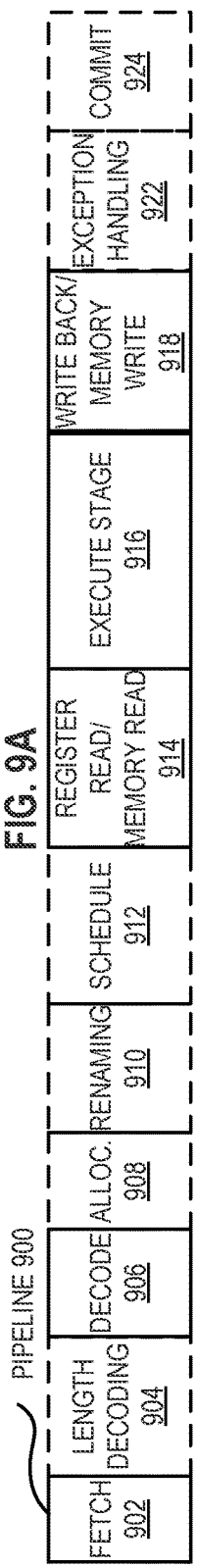
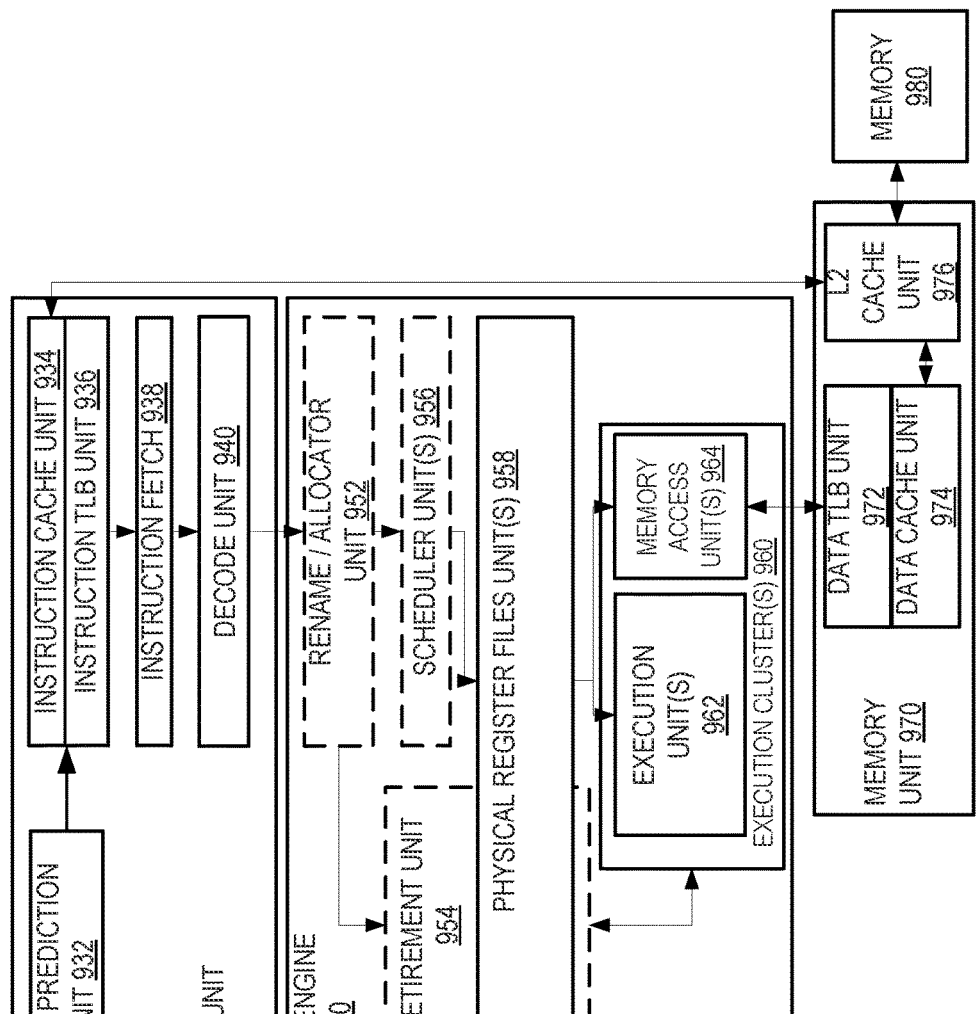

METHODS, SYSTEMS, AND APPARATUSES TO OPTIMIZE PARTIAL FLAG UPDATING INSTRUCTIONS VIA DYNAMIC TWO-PASS EXECUTION IN A PROCESSOR

TECHNICAL FIELD

The disclosure relates generally to electronics, and, more specifically, an embodiment of the disclosure relates to circuitry to implement dynamic two-pass execution of a partial flag updating instruction in a processor.

BACKGROUND

A processor, or set of processors, executes instructions from an instruction set, e.g., the instruction set architecture (ISA). The instruction set is the part of the computer architecture related to programming, and generally includes the native data types, instructions, register architecture, addressing modes, memory architecture, interrupt and exception handling, and external input and output (I/O). It should be noted that the term instruction herein may refer to a macro-instruction, e.g., an instruction that is provided to the processor for execution, or to a micro-instruction, e.g., an instruction that results from a processor's decoder decoding macro-instructions.

BRIEF DESCRIPTION OF THE DRAWINGS

The present disclosure is illustrated by way of example and not limitation in the figures of the accompanying drawings, in which like references indicate similar elements and in which:

FIG. 8 is a flow diagram illustrating operations for dynamic two-pass execution of a (e.g., partial flag register updating) single micro-operation according to embodiments of the disclosure.

FIG. 9A is a block diagram illustrating both an exemplary in-order pipeline and an exemplary register renaming, out-of-order issue/execution pipeline according to embodiments of the disclosure.

FIG. 9B is a block diagram illustrating both an exemplary embodiment of an in-order architecture core and an exemplary register renaming, out-of-order issue/execution architecture core to be included in a processor according to embodiments of the disclosure.

DETAILED DESCRIPTION

Figure 1:
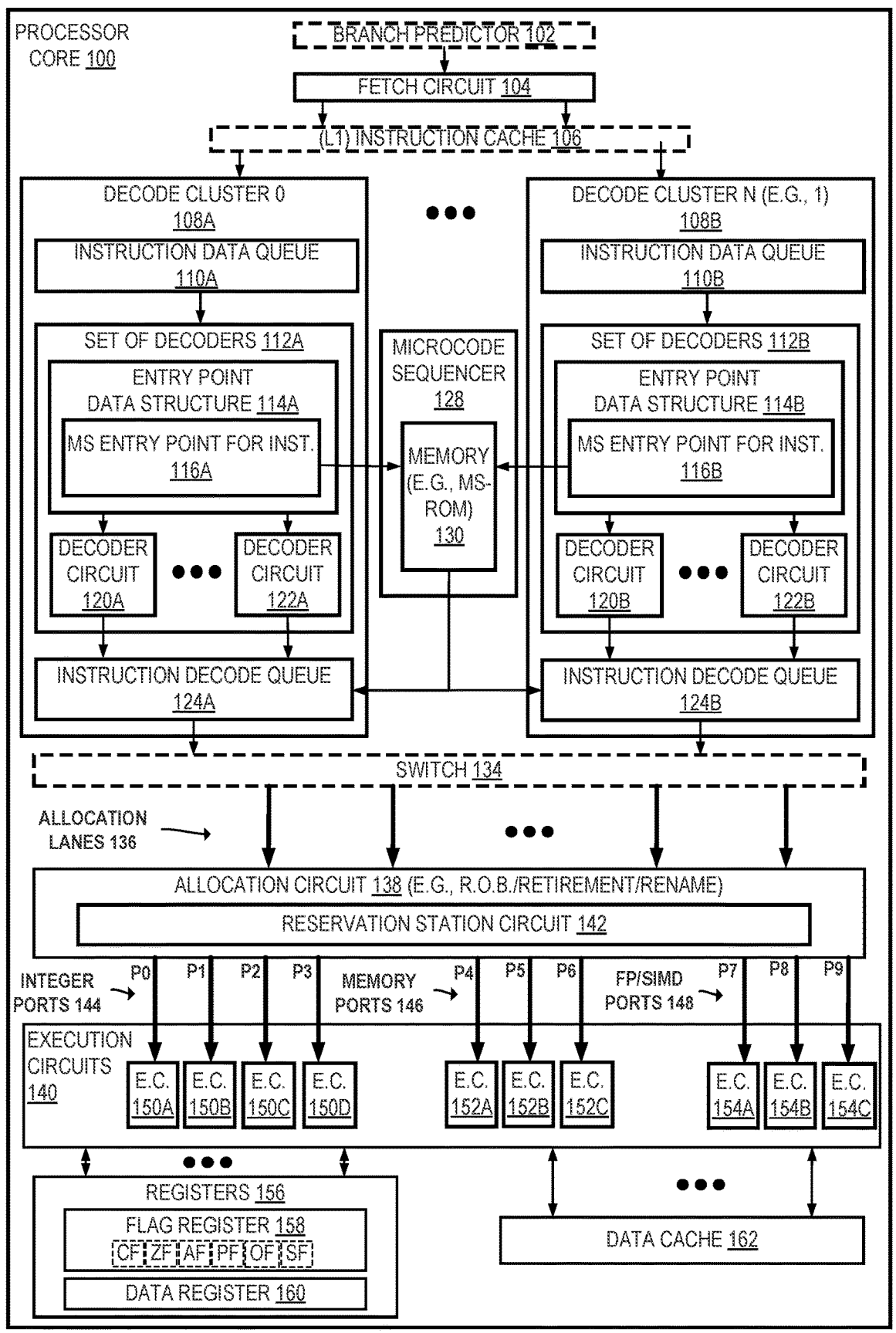
FIG. 1 illustrates a processor core having an allocation circuit comprising a reservation station circuit that implements dynamic two-pass execution of a partial flag register updating instruction according to embodiments of the disclosure.

In the following description, numerous specific details are set forth. However, it is understood that embodiments of the disclosure may be practiced without these specific details. In other instances, well-known circuits, structures and techniques have not been shown in detail in order not to obscure the understanding of this description.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

A (e.g., hardware) processor (e.g., having one or more cores) may execute (e.g., user-level) instructions (e.g., a thread of instructions) to operate on data, for example, to perform arithmetic, logic, or other functions. For example, software may include a plurality of instructions (e.g., macro-instructions) that are provided to a processor (e.g., a core or cores thereof) that then executes (e.g., decodes and executes) the plurality of instructions to perform the corresponding operations. In certain embodiments, a processor includes circuitry (e.g., one or more decoder circuits) to translate (e.g., decode) an instruction into one or more micro-operations (µops or micro-ops), for example, with these micro-operations directly executed by the hardware (e.g., by execution circuits). One or more micro-operations corresponding to an instruction (e.g., macro-instruction) may be referred to as a microcode flow for that instruction. A micro-operation may be referred to as a micro-instruction, for example, a micro-instruction that resulted from a processor's decoding of a macro-instruction. In one embodiment, the instructions are 64 bit and/or 32 bit instructions of an instruction set architecture (ISA). In one embodiment, the instructions are (e.g., 64 bit and/or 32 bit) instructions of an Intel® instruction set architecture (ISA). In certain embodiments, the translation of an instruction into one or more micro-operations is associated with the instruction fetch and/or decode portion of a processor's pipeline.

In certain processors, the operations (e.g., micro-operations) that are to be executed (e.g., received from one or more instruction decode queues) are sent on one or more (e.g., allocation) lanes to a circuit (e.g., allocation circuit) that allocates execution resources for the operations. In certain embodiments, an allocation circuit is responsible for allocating a micro-operation to an execution circuit (e.g., a reservation station circuit corresponding to that execution circuit). In certain embodiments, allocation circuit sends certain information for a micro-operation to reservation station circuit, e.g., so that the reservation station circuit can monitor the source (e.g., and destination) operand(s) for that micro-operation and indicate when that micro-operation is to be dispatched to the execution circuit for execution. In one embodiment, a reservation station circuit is to track the dependency chain of micro-operations (µops).

An instruction (e.g., one or more micro-operations thereof) may update data register(s) only, update flag register(s) only, or update data and flag registers together. In certain embodiments, a single instruction is implemented as single micro-operation (µop) for best performance. Certain instruction set architectures (ISAs), e.g., x86 ISA, utilize a (e.g., logically single) flag (e.g., status) register to store a plurality of flags therein, for example, where one or more of the flags are updated to indicate a current state of the processor (e.g., core). The flags may be individual bits that are implicitly or explicitly read and/or written by micro-operations executing on the processor. A flag register may allow a subsequent instruction (e.g., micro-operation) to take an action(s) contingent on the outcome of a previous instruction (e.g., micro-operation). For example, where one or more of the flags in the flag register are modified as effects of arithmetic operations and/or (e.g., logical AND, NAND, OR, NOR, XOR, etc.) bit manipulation operations. For example, a zero flag (e.g., bit) may be set (e.g., to binary one) if the result of the operation is zero and cleared (e.g., to binary zero) if it is nonzero. Other classes of instructions (e.g., micro-operations) may also modify the flags to indicate status. One or more flags may be read by a subsequent conditional instruction so that the specified action (e.g., depending on the ISA, this may be a jump, call, return, etc.) occurs only if the flag(s) indicate a specified result of the earlier instruction.

Per certain instruction definitions, a micro-operation updating a flag register (e.g., a flag writer) may update some or all flags (e.g., individual fields) within a flag register. An instruction (e.g., micro-operation) that only updates one or more, but not all, flags in a flag register (e.g., such that the non-updated flag(s) remain unchanged) as a partial flag updating instruction (e.g., micro-operations).

However, in certain embodiments such partial flag instructions (e.g., micro-operations) are problematic to handle when flag register is renamed as a single logical (e.g., flag) register, e.g., in an out-of-order processor (e.g., core). In one embodiment, to generate the correct final flag register result, unmodified flag(s) from the flag register are merged with the flag(s) modified by a partial flag updating instruction (e.g., micro-operation), e.g., such that the partial flag updating instruction (e.g., micro-operation) reads the last flag register (e.g., values of the flags prior to executing the partial flag updating instruction (e.g., micro-operation)) as a register source. Thus, certain embodiments of partial flag updating instructions (e.g., micro-operations) have a dependence on any previous (e.g., in program order) flag updating instructions (e.g., either full flag writer or partial flag updating writer). This may unnecessarily delay execution of dependent instruction(s) (e.g., micro-operation(s)) of the partial flag updating instruction (e.g., micro-operation) where the dependent instruction (e.g., micro-operation) only needs the data result (and not the flag result) from the partial flag updating instruction. In one embodiment, a flag register is renamed, so instead of performing a partial write on that register, a subset of bits from a last flag source (e.g. CF in INC/DEC) is merged with a newly created flag (e.g., ZF,AF, PF,OF,SF by INC/DEC) and written to a new renamed register (e.g., effectively copying CF from old renamed register to new renamed register in partial flag write operation in register renaming machine).

Embodiments herein utilize dynamic two-pass execution to break a false dependence on a last update (e.g., in program order) of a flag register. Certain embodiments herein achieve this goal without breaking the flags of a (e.g., logically single) flag register into different (e.g., logically single) flag registers (e.g., groups (e.g., sub-groups) of one or more flags split into corresponding (e.g., logically single) flag registers), for example, for renaming/tracking purpose. Certain embodiments herein achieve this goal without unconditionally splitting a partial flag updating instruction into multiple micro-operations, e.g., at the decoder of a processor's pipeline. Embodiments herein consume minimal overhead resources in a processor, while minimizing any additional hardware and therefore minimizing any impact to area and power usage.

FIG. 1 illustrates a processor core 100 having an allocation circuit 138 comprising a reservation station circuit 142 that implements dynamic two-pass execution of a partial flag register updating instruction according to embodiments of the disclosure. The reservation station circuit may be a single reservation station circuit (for example, shared between the execution circuits 140, e.g., execution input ports 144, 146, and/or 148) or a plurality of reservation station circuits (for example, one reservation station circuit of a plurality of reservation station circuits for each of the execution circuits 140, e.g., for each of execution input ports 144, 146, and/or 148).

The plurality of execution circuits 140 may include a plurality of different types of execution circuits, for example, integer type of execution circuit(s), memory type of execution circuit(s), floating point type of execution circuit(s), single instruction, multiple data (SIMD) (e.g., vector) type of execution circuit(s), or any combination thereof. Execution circuits 140 may include (i) a set of one or more integer type of execution circuits 150A, 150B, 150C, and 150D having corresponding integer ports 144 (labeled ports P0, P1, P2, and P3, respectively) (although shown as having four ports and four corresponding execution circuits of this type, any single or plurality may be utilized in certain embodiments), (ii) a set of one or more memory type of execution circuits 152A, 152B, and 152C, having corresponding memory ports 146 (labeled ports P4, P5, and P6, respectively) (although shown as having three ports and three corresponding execution circuits of this type, any single or plurality may be utilized in certain embodiments), and/or (iii) a set of one or more floating point type and/or SIMD type of execution circuits 154A, 154B, and 154C having corresponding floating point/SIMD ports 148 (labeled ports P7, P8, and P9, respectively) (although shown as having three ports and three corresponding execution circuits of this type, any single or plurality may be utilized in certain embodiments).

Operations to be executed (e.g., micro-operations from decoder circuits 120A-122A and/or decoder circuits 120B-122B) may be sent from allocation lanes 136 (for example, which may be any plurality, e.g., greater than the number of ports, equal to the number of ports, and/or less than the number or ports) to execution circuits 140 via ports 144, 146, and/or 148. In certain embodiments, the number of allocation lanes is referred to as the allocation width, e.g., the number of micro-operations which can be allocated (e.g., from instruction decode queue 124A and/or instruction decode queue 124B).

In certain embodiments, allocation circuit 138 is included to allocate the execution circuits 140 for the incoming micro-operations on allocation lanes 136. In certain embodiments, a reservation station circuit 142 is included to dispatch micro-operations when they are ready for execution, e.g., by sending the micro-operation on one or more issue (or dispatch) ports of the reservation station circuit 142 to a corresponding execution circuit of execution circuits 140. In one embodiment, a reservation station circuit 142 checks if the operand(s) for a micro-operation (e.g., as indicated in its reservation station entry) are available and if the corresponding execution circuit is available (e.g., free for use), and dispatches the micro-operation for execution in response to the operand(s) being available and the corresponding execution circuit being available. In certain embodiments, a processor utilizes register renaming to abstract a logical register from a physical register, e.g., with those logical register(s) utilized by reservation station (e.g., scheduler) circuit.

Processor core 100 may be one of a plurality of cores of a processor, e.g., of a system. Processor core 100 may include a branch predictor 102 (e.g., to predict one or more branches of the code (e.g., instructions) that are to be executed by the processor core 100. In certain embodiments, the branch predictor 102 (e.g., branch predictor circuit) learns from past behavior of branches to predict a next (e.g., incoming) branch. In certain embodiments, the branch predictor 102 predicts a proper subset of (e.g., contiguous in the original program order) instructions as a block of code (e.g., ending in a branch instruction). As one example, processor core 100 may receive code to execute and, in response, may divide the code into blocks.

In certain embodiments, the processor core 100 (e.g., via the fetch circuit 104 and/or branch predictor 102) may send the blocks of instructions to a decode cluster, for example, with a first block of instructions sent to decode cluster 0 108A, a (next in program order, e.g., younger) second block of instructions sent to decode cluster N 108B, etc. In a two-cluster example, a third (next in program order, e.g., younger) block of instructions may be sent to the next available decode cluster (e.g., after it has finished decode of its current block of instructions). In a two-cluster example, a third (next in program order, e.g., younger) block of instructions may be sent to the next decode cluster (e.g., to decoder cluster 108A in this example). Although two decode clusters 108A-108B are shown, it should be understood that three or more clusters may be utilized (e.g., where "N" is a positive integer greater than one).

In certain embodiments, each decode cluster includes two or more (e.g., superscalar x86) instruction decoders capable of decoding different basic blocks of code out-of-order with respect to each other, for example, with decode cluster 108A including a first decoder circuit 120A (e.g., decoder) and a second decoder circuit 122A (e.g., decoder), and decode cluster 108B including a second decoder circuit 120B (e.g., decoder) and a second decoder circuit 122B (e.g., decoder).

In certain embodiments, the branch predictor 102 of the processor core 100 divides code into individual blocks (e.g., of a set of contiguous instructions from the program). In certain embodiments, the fetch circuit 104 of the processor core 100 divides code into individual blocks (e.g., of a set of contiguous instructions from the program). The individual code blocks may then be sent to their respective decode cluster for decoding, for example, to a respective instruction data queue (e.g., instruction data queue 110A as an input queue for decode cluster 108A and instruction data queue 110B as an input queue for decode cluster 108B).

Optionally, processor core 100 includes a (e.g., level one) instruction cache 106, e.g., to cache one or more instructions without having to load them from memory. In certain embodiments, fetch circuit 104 sends code blocks to their respective decode cluster via instruction cache 106. Instruction cache 106 may include an instruction cache tag and/or instruction translation lookaside buffer (TLB). In certain embodiments, once the code blocks are sent to their corresponding decode cluster 108A-108B, each decode cluster begins decoding the code blocks in parallel (e.g., via the parallel decoder circuits therein). In certain embodiments, decode clusters operate independently of each other, so the blocks of code can be decoded out-of-order (e.g., out of program order).

In certain embodiments, the allocation circuit 138 is responsible for allocating the operations (e.g., micro-operations) to the execution circuits 140 (e.g., execution units), e.g., in the proper program order. The allocation circuit 138 may perform retirement and/or renaming, e.g., as well as including a re-order buffer (ROB) for reordering any out-of-order instruction (e.g., micro-operation) execution. In certain embodiments, processor core 100 includes a reservation station circuit 142 to cause a micro-operation to be sent (e.g., dispatched) to execution circuits 140 when that micro-operation is ready for execution, e.g., source operand(s) are available. In certain embodiments, reservation station circuit 142 includes a plurality of reservation station entries, e.g., one for each micro-operation awaiting execution.

Processor core depicts a first decode cluster 108A with a plurality of decoder circuits 120A-122A in a first set 112A and a second decode cluster 108B with a plurality of decoder circuits 120B-122B in a second set 112B. In certain embodiments, a (e.g., each) decoder circuit (120A, 122A, 120B, 122B) is to decode a (e.g., macro) instruction into a set of one or more micro-operations that are to be executed (e.g., as a primitive) by an execution circuit(s) 140. In certain embodiments, a decoder circuit (120A, 122A, 120B, 122B) is to decode certain (e.g., macro) instructions into a corresponding set of one or more micro-operations without utilizing a microcode sequencer 128 (e.g., a microcode sequencer separate from any decode cluster and/or decoder circuit) and/or decode other (e.g., macro) instructions (e.g., complex instruction set computer (CISC) instructions) into a corresponding set of one or more micro-operations by utilizing the microcode sequencer 128 (e.g., the microcode sequencer separate from any decode cluster and/or decoder circuit). In one embodiment, a decoder circuit (120A, 122A, 120B, 122B) is to output a certain number of micro-operation per cycle (e.g., one micro-operation per cycle and/or between one and four micro-operations per cycle). In certain embodiments, a "micro-coded" instruction generally refers to an instruction where a decode cluster (e.g., set of decoders) requests the microcode sequencer 128 to load the corresponding set of one or more (e.g., plurality of) micro-operations (μops) from the microcode sequencer memory 130 (e.g., read-only memory (ROM)) into the decode pipeline (e.g., into the corresponding instruction decode queue), e.g., instead of producing that instruction's set of one or more micro-operations directly by a decoder circuit. For example, to implement some (e.g., complex) (e.g., x86) instructions, a microcode sequencer 128 is used to divide the instruction into a sequence of smaller (e.g., micro) operations (also referred to as micro-ops or μops).

In certain embodiments, each decode cluster (e.g., each decoder circuit in some embodiments) includes a data structure to store a corresponding entry point value (e.g., address) for one or more instructions into memory 130 of microcode sequencer 128 and/or a number of bits (e.g., the number of cycles to generate the corresponding micro-operations for an instruction and/or the number of micro-operations for the instruction). For example, (1) with data structure 114A of decode cluster 108A including one or more entries that each indicate (e.g., for a single instruction), an entry point 116A for an instruction and/or bits (e.g., a coded value) for the instruction and/or (2) with data structure 114B of decode cluster 108B including one or more entries that each indicate (e.g., for a single instruction), an entry point 116B for an instruction and/or bits (e.g., coded value) for the instruction. In certain embodiments, data structure 114A and data structure 114B are copies of each other, e.g., they include the same data. In one embodiment, data structure 114A and data structure 114B are loaded with their data at manufacturing time. In one embodiment, data structure 114A and data structure 114B are loaded with their data during processor boot, e.g., by executing Basic Input/Output System (BIOS) firmware or Unified Extensible Firmware Interface (UEFI) firmware.

After decoding of an instruction into its respective micro-operations (e.g., by decoder circuits or microcode sequencer), in certain embodiments they are stored in an instruction decode queue. In FIG. 1 (e.g., at the end of the decode stage), decode cluster 108A includes instruction decode queue 124A (e.g., instruction queue) that receives respective micro-operations from decoder circuits 120A-122A and from microcode sequencer 128 (e.g., when decode cluster 108A is arbitrated access to memory 130) and decode cluster 108B includes instruction decode queue 124B (e.g., instruction queue) that receives respective micro-operations from decoder circuits 120B-122B and from microcode sequencer 128 (e.g., when decode cluster 108B is arbitrated access to memory 130).

Optionally, switch 134 is included to couple output(s) of instruction decode queues 124A-124B to allocation lanes 136 (e.g., input(s)) of allocation circuit 138. In certain embodiments, allocation circuit 138 is to send micro-operations from the instruction decode queues 124A-124B (e.g., in or out of program order) to an execution circuit of execution circuits 140 (e.g., via reservation station circuit 142). In certain embodiments, processor core 100 includes a reservation station circuit 142 to cause a micro-operation to be sent (e.g., dispatched) to execution circuits 140 when that micro-operation is ready for execution, e.g., source operand(s) are available. In certain embodiments, reservation station circuit 142 includes a plurality of reservation station entries, e.g., one for each micro-operation awaiting execution.

Certain execution circuits 140 (e.g., memory execution circuits 150A-154C) may access storage, e.g., registers 156 and/or data cache 162 (e.g., one or more levels of a cache hierarchy). Once the resultants are generated by the execution circuits 140, a retirement circuit (e.g., within allocation circuit 138) may then retire a corresponding instruction.

In certain embodiments, registers 156 includes a flag register 158 and/or data register 160 (e.g., a general-purpose data register). In one embodiment, the flag register 158 includes a field (e.g., a single bit wide) for each flag therein. Flags may include one, all, or any combination of a carry flag (CF), a zero flag (ZF), an adjust flag (AF), a parity flag (PG), an overflow flag (OF), or a sign flag (SF). In one embodiment, flag register 158 (e.g., only) includes six flags (e.g., CF, ZF, AF, PF, OF, and SF). In one embodiment, each flag is a single bit, e.g., with certain bits of the register not utilized. In one embodiment, CF is in bit index zero of flag register 158, ZF is in bit index six of flag register 158, AF is in bit index four of flag register 158, PF is in bit index two of flag register 158, OF is in bit index eleven of flag register 158, and/or SF is in bit index seven of flag register 158.

In certain embodiments, flag register 158 is a single logical register, e.g., referenced as EFLAGS (e.g., 32 bits wide) or RFLAGS (e.g., 64 bits wide). In certain embodiments, carry flag (CF) (e.g., bit) is set (e.g., to binary one) (e.g., by flag logic in an execution circuit that updates the flag register) if the result of an (e.g., arithmetic) operation (e.g., a micro-operation) has an arithmetic carry and cleared (e.g., to binary zero) if there is no arithmetic carry. In certain embodiments, a zero flag (ZF) is set (e.g., to binary one) (e.g., by flag logic in an execution circuit that updates the flag register) if the result of an (e.g., arithmetic) operation (e.g., a micro-operation) is a zero and cleared (e.g., to binary zero) if not a zero. In certain embodiments, an adjust flag (AF) (or auxiliary flag or auxiliary carry flag) is set (e.g., to binary one) (e.g., by flag logic in an execution circuit that updates the flag register) if the (e.g., arithmetic) operation (e.g., a micro-operation) has caused an arithmetic carry or borrow (e.g., out of the four least significant bits) and cleared (e.g., to binary zero) otherwise. In certain embodiments, a parity flag (PG) is set (e.g., to binary one) (e.g., by flag logic in an execution circuit that updates the flag register) if the result of an (e.g., arithmetic) operation (e.g., a micro-operation) has an even number and cleared (e.g., to binary zero) if an odd number. In certain embodiments, an overflow flag (OF) is set (e.g., to binary one) (e.g., by flag logic in an execution circuit that updates the flag register) if the result of an (e.g., arithmetic) operation (e.g., a micro-operation) overflows and cleared (e.g., to binary zero) if there is no overflow, for example, an overflow when the (e.g., signed two's-complement) result of the operation would not fit in the number of bits used for the operation, e.g., is wider than the execution circuit (e.g., arithmetic logic unit (ALU) thereof) width. In certain embodiments, a sign flag (SF) is set (e.g., to binary one) (e.g., by flag logic in an execution circuit that updates the flag register) if the result of an (e.g., arithmetic) operation (e.g., a micro-operation) has a negative number and cleared (e.g., to binary zero) if a positive number, e.g., for a signed (+ or −) value resultant.

Two non-limiting examples of a partial flag updating instruction (e.g., micro-operation) are an increment (INC) instruction (e.g., corresponding to a single micro-operation) and a decrement (DEC) instruction (e.g., corresponding to a single micro-operation). In one embodiment, execution of an increment (INC) instruction (e.g., implemented as a single INC micro-operation) adds one to a destination operand, for example, while preserving the state of the CF flag (e.g., while modifying the OF, SF, ZF, AF, and PF flags according to the result). In one embodiment, execution of a decrement (DEC) instruction (e.g., implemented as a single DEC micro-operation) subtracts one from a destination operand, for example, while preserving the state of the CF flag (e.g., while modifying the OF, SF, ZF, AF, and PF flags according to the result). A destination operand can be a register or a memory location. These INC and DEC instructions allow a loop counter to be updated without disturbing the CF flag in certain embodiments.

Although an increment (INC) instruction (e.g., corresponding to a single micro-operation) and a decrement (DEC) instruction (e.g., corresponding to a single micro-operation) are used as examples, it should be understood that other instructions may utilize the disclosure herein, for example, another partial flag updating instruction (e.g., corresponding to a single micro-operation).

Figure 2:
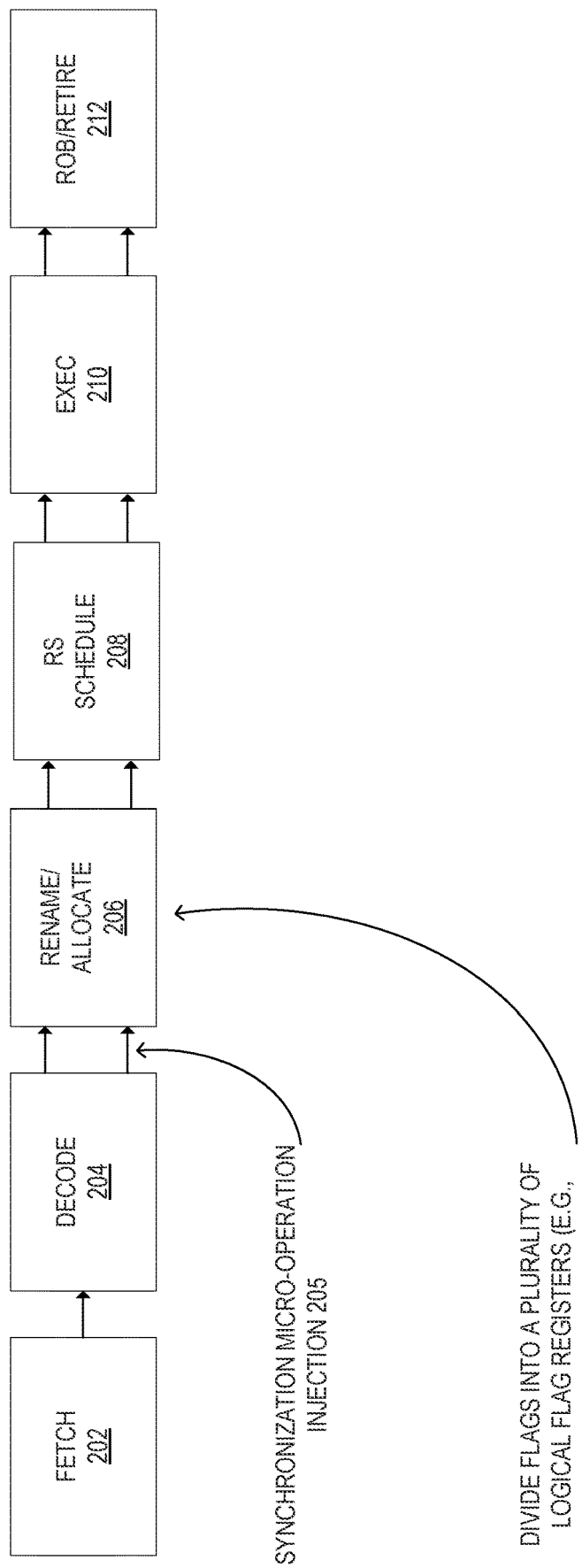
FIG. 2 illustrates the processing of a partial flag register updating instruction by a processor core pipeline including the renaming each group of flags and injection of a synchronization micro-operation according to embodiments of the disclosure.

FIG. 2 illustrates the processing of a partial flag register updating instruction (e.g., INC or DEC) by a processor core pipeline 200 including the renaming 207 each group of flags and injection 205 of a synchronization micro-operation according to embodiments of the disclosure. In certain embodiments, pipeline 200 includes a fetch 202 stage to fetch an instruction, a decode 204 stage to decode a fetched instruction into as set of one or more micro-operations for execution to perform the requested operation(s) of the instruction, a rename/allocate 206 stage to rename/allocate resources, a reservation station (RS) schedule 208 stage (e.g., to monitor operand(s) and dispatch a corresponding micro-operation for execution when the operands are ready), an execution 210 stage to execute the micro-operation, and a ROB/retire 212 stage for reordering/retirement of the micro-operation.

In one embodiment, pipeline 200 receives an instruction that is to perform a partial flag update on a flag register (e.g., flag register 158 in FIG. 1) in addition to updating a data location (e.g., data register 160 or data cache 162 in FIG. 1), and in response, divides the flags of a (e.g., logically single) flag register into different (e.g., logically single) flag registers (e.g., groups (e.g., sub-groups) of one or more flags split into corresponding (e.g., logically single) flag registers). For example, logically putting the CF flag in a first flag register and logically putting the other flag(s) (e.g., OF, SF, ZF, AF, and PF flags) in a second flag register, e.g., such that the first and second flag registers can be renamed and tracked independently for dependence to avoid false dependence.

However, in certain embodiments doing so (e.g., separating flags of a single flag register into multiple logical flag registers (e.g., separate flag bit renaming) (e.g. renaming CF as a first logical register and ZF, AF, OF, PF, and SF flags as different logical register(s)), is expensive in terms of area, power, timing to rename different flags (e.g., bits of a flag register) into separate logic registers, e.g., as it requires adding new logical register to be tracked throughout a pipeline from rename to retire. Additionally or alternatively, in certain embodiments doing so (e.g., separating flags of a single flag register into multiple logical flag registers (e.g., separate flag bit renaming) (e.g. renaming CF as a first logical register and ZF, AF, OF, PF, and SF flags as different logical register(s)), requires injection 205 of a synchronization micro-operation, e.g., into instruction stream when a plurality of logical flag (e.g., sub-group) registers are required, e.g., as they do not all reside in the same physical register. In one embodiment, a synchronization micro-operation is injected 205 statically based on the instruction stream early in pipeline without dynamic execution information. Therefore, additional bandwidth is consumed at allocation, execution, and retirement. In certain embodiments, synchronization micro-operation also occupies expensive resources such as its own reservation station entry. Furthermore, in certain embodiments, a synchronization micro-operation is inserted immediately prior to a flag consuming micro-operation (e.g., inserted at decode 204), disallowing early execution of the synchronization micro-operation, which may delay a dependent flag consumer micro-operation in the critical dependence chain and result in performance loss.

Figure 3:
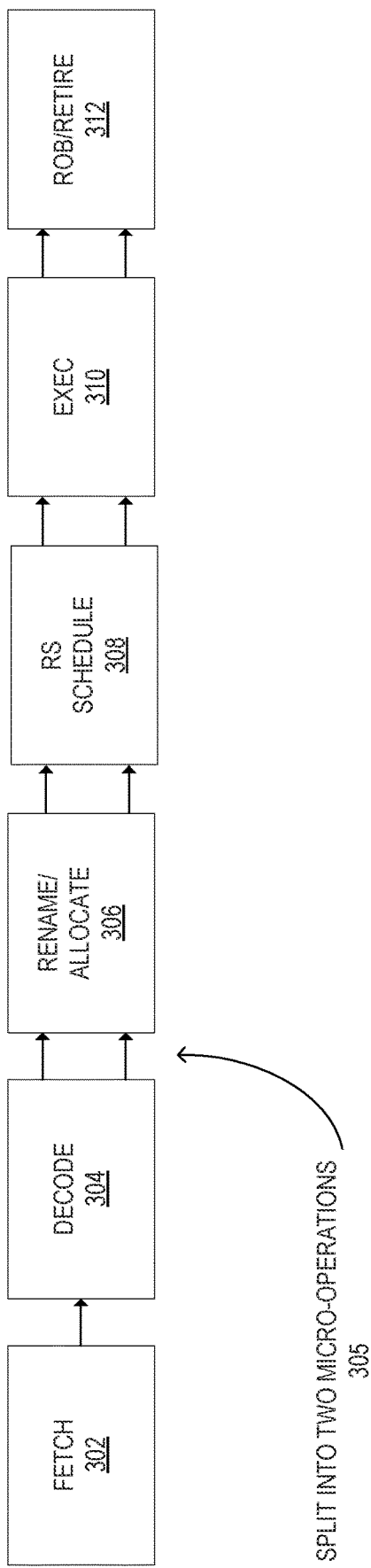
FIG. 3 illustrates the processing of a partial flag register updating instruction by a processor core pipeline including the splitting of the partial flag register updating instruction into two micro-operations according to embodiments of the disclosure.

FIG. 3 illustrates the processing of a partial flag register updating instruction by a processor core pipeline 300 including the splitting 305 of the partial flag register updating instruction into two micro-operations according to embodiments of the disclosure. In certain embodiments, pipeline 300 includes a fetch 302 stage to fetch an instruction, a decode 304 stage to decode a fetched instruction into as set of one or more micro-operations for execution to perform the requested operation(s) of the instruction, a rename/allocate 306 stage to rename/allocate resources, a reservation station (RS) schedule 308 stage (e.g., to monitor operand(s) and dispatch a corresponding micro-operation for execution when the operands are ready), an execution 310 stage to execute the micro-operation, and a ROB/retire 312 stage for reordering/retirement of the micro-operation.

In one embodiment, pipeline 300 receives an instruction that is to perform a partial flag update on a flag register (e.g., flag register 158 in FIG. 1) in addition to updating a data location (e.g., data register 160 or data cache 162 in FIG. 1), and in response, splits 305 (or cracks) a partial flag updating micro-operation into two micro-operations. Splitting may be done in instruction decode 304 stage (e.g., by instruction decoder circuit) (or at later stage prior to start of out-of-order pipeline). In certain embodiments, the first micro-operation from the split (e.g., the upper arrow from decode 304) is selected to depend on all source operands except last flag source operand (for example, any flag, e.g., CF) and execution computes a data resultant only, and the second micro-operation from the split (e.g., the lower arrow from decode 304) depends on first micro-operation and the last flag register source operand (e.g., CF), for example, an execution generates final flag result by merging new flag bits from first micro-operation and any remaining flag bits from last flag register source. In certain embodiments, a dependent micro-operation (e.g., from an instruction that is not the instruction that was split) wanting only the data resultant (e.g., as an input) is setup to depend on the first microoperation, e.g., since the first micro-operation has no dependence on the previous contents of the flag register (e.g., the CF field is to be updated), the data dependent micro-operation may execute without false dependence on last flag register used by partial flag updating instruction.

However, in certain embodiments doing so (e.g., splitting the single micro-operation into a plurality of micro-operations, e.g., and thus consuming a plurality of reservation station entries or other resources), creates extensive duplicity, and thus inefficiency, for example, where micro-operation splitting (e.g., cracking) happens early in pipeline 300, e.g., and is required for all occurrence of partial flag updating micro-operations. Therefore, in such embodiments the splitting results in doubling decode, allocation, execution and retire bandwidth usage for each partial flag updating instruction. Such embodiments also double usage in expensive resources, for example, where each partial flag updating instruction uses two reservation station entries. Such embodiments also cause the flag result to always be computed at least one cycle later than the data result for partial flag updating micro-operation, e.g., with these causing performance losses and power penalties.

Figure 4:
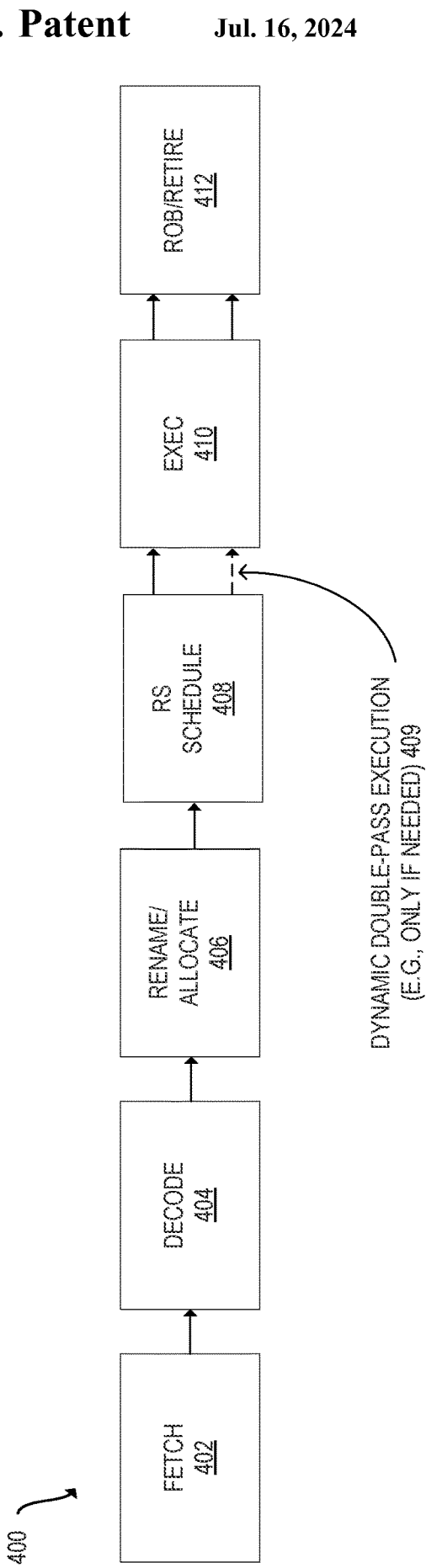
FIG. 4 illustrates the processing of a partial flag register updating instruction by a processor core pipeline including dynamic double-pass execution according to embodiments of the disclosure.

FIG. 4 illustrates the processing of a partial flag register updating instruction by a processor core pipeline 400 including dynamic double-pass execution 409 according to embodiments of the disclosure. In certain embodiments, pipeline 400 includes a fetch 402 stage to fetch an instruction, a decode 404 stage to decode a fetched instruction into as set of one or more micro-operations for execution to perform the requested operation(s) of the instruction, a rename/allocate 406 stage to rename/allocate resources, a reservation station (RS) schedule 408 stage (e.g., to monitor operand(s) and dispatch a corresponding micro-operation for execution when the operands are ready), an execution 410 stage to execute the micro-operation, and a ROB/retire 412 stage for reordering/retirement of the micro-operation.

In one embodiment, pipeline 400 receives an instruction that is to perform a partial flag update on a flag register (e.g., flag register 158 in FIG. 1) in addition to updating a data location (e.g., data register 160 or data cache 162 in FIG. 1), and in response, performs dynamic double-pass execution 409, e.g., to avoid the disadvantages discussed herein. For example, in contrast to processing a partial flag register updating instruction (e.g., INC or DEC) by separating flags of a single flag register into multiple logical flag registers (e.g., renaming 207 each group of flags and injecting 205 of a synchronization micro-operation as discussed in reference to FIG. 2), embodiments of dynamic double-pass execution do not break down a logical flag register into multiple logical (e.g., sub-group) flag registers and there is no need to inject a synchronization micro-operation. As another example, in contrast to processing a partial flag register updating instruction (e.g., INC or DEC) by splitting (e.g., splitting 305 as discussed in reference to FIG. 3) of the partial flag register updating instruction into two micro-operations, embodiments of dynamic double-pass execution do not split the partial flag updating instruction (e.g., single micro-operation) into multiple (e.g., 2) micro-operations for execution.

In certain embodiments, dynamic double-pass execution of a partial flag updating micro-operation breaks false dependence on a last flag writer producer (e.g., producer micro-operation). In certain embodiments, a partial flag updating micro-operation (e.g., INC micro-operation or DEC micro-operation) remains a single micro-operation (uop) throughout a processor (e.g., its pipeline). In certain embodiments, dynamic double-pass execution of a partial flag updating micro-operation comprises, based on the dynamic execution status and type of last flag writer micro-operation (e.g., at insertion of the partial flag updating micro-operation into a reservation station), a scheduler hint is created to either dispatch the partial flag updating micro-operation for a single-pass execution (for example, to generate a data resultant and a flag resultant at the same time if the flag operand source is determined to be ready, e.g., earlier than other operand sources) or dispatch the partial flag updating micro-operation for double-pass execution (e.g., to generate the data resultant on the first pass and the flag resultant on the second pass). Certain embodiments herein maximize the single-pass case whenever possible to reduce execution resource usage for best performance. In one embodiment, both a first-pass dispatch and a second-pass dispatch (e.g., from reservation station circuit to an execution circuit) broadcast wakes up (e.g., via sending a ready indication to) a micro-operation (e.g., with the same signature) since both passes broadcast from the same reservation entry. Certain embodiments herein overcome this aliasing problem by, (i) for a micro-operation depending on data result and not the flag result from a two-pass partial flag updating micro-operation, waking up (e.g., marking an entry in a reservation station as ready for execution) in response to the first broadcast, but (ii) for a micro-operation depending on the flag result (and optionally, the data result) from a two-pass partial flag updating micro-operation, not waking up (e.g., ignoring the wakeup) in response to the first broadcast (e.g., during reservation station insertion) from the first execution and waking up only in response to the second broadcast from the second pass execution.

Embodiments herein of dynamic double-pass execution avoid statically splitting a partial updating micro-operation into two micro-operation and/or injecting a synchronization micro-operation (e.g., early) into a pipeline. Embodiments herein of dynamic double-pass execution allow a single partial flag updating micro-operation to remain as the single unsplit micro-operation throughout a processor (e.g., throughout its pipeline), for example, minimizing allocation, retirement bandwidth usage overhead, and/or reservation station occupancy. Embodiments herein of dynamic double-pass execution optimize execution bandwidth where double-pass execution is enabled only as needed based on dynamic execution information.

Embodiments herein of dynamic double-pass execution resolve a partial flag writer micro-operation's false dependence on a last flag writer (e.g., last flag writer in program order before the partial flag writer) using minimal queuing resources and pipeline bandwidth overhead, e.g., at the same time with minimized hardware additions. Embodiments herein of dynamic double-pass execution avoid statically splitting a partial updating micro-operation without splitting throughout a pipeline, thus, minimizing usage to queuing and pipeline resources, freeing up resources for improved performance, avoiding a bandwidth bottleneck at decode, allocation, execution, and/or retire, and reducing power consumption due to minimized usage of resources. Embodiments herein of dynamic double-pass execution do not add a new logical register(s) and associated tracking hardware throughout a processor (e.g., pipeline), e.g., in comparison to sub-group flag renaming and a synchronization micro-operation injection mechanism which may delay critical dependence chain execution and consume queuing and pipeline resource, e.g., thus avoiding an area and power penalty of such designs. Embodiments herein of dynamic double-pass execution do not degrade a (e.g., critical) single cycle wakeup scheduler timing loop.

More particularly, in certain embodiments, a partial flag updating (partial flag writer) instruction optimization uses dynamic two-pass execution for such (e.g., INC and/or DEC) instructions. In certain embodiments, a partial flag updating instruction is handled as a single micro-operation (e.g. a non-partial flag updating micro-operation) from fetch to insertion into reservation station (RS) and retirement, e.g., without any special handling. In certain embodiments, a partial flag updating instruction has a source data register operand and a last flag register source operand. In certain embodiments, the data result (e.g., plus 1 or minus 1 for INC and DEC, respectively) for the destination register can be computed from only the source data register operand, but the flag result for destination flag register can only be computed using both the data register source operand and the last flag register source operand in certain embodiments. In one embodiment, e.g., at a partial flag updating micro-operation insertion into a reservation station and using the last flag register source readiness status at that time, it is determined whether single-pass execution can be used or double-pass execution from RS is desired.

Single Vs Two Pass Dispatch

In certain embodiments, the criteria for allowing single-pass execution is as follows:
  (i) the last flag source operand (for example, any flag, e.g., CF in the discussion above) is ready at the time of RS insertion of partial flag updating micro-operation (e.g., INC or DEC), or
  (ii) both flag and data source operands of partial flag updating micro-operation (e.g., INC or DEC) are produced by the same producer and therefore are to be ready at the same time (e.g., unless producer is also a partial flag updating micro-operation).

In certain embodiments, satisfying (i) or (ii) above guarantees that the last flag source operand is ready at or before other source operands of the partial flag updating micro-operation. Therefore, the partial flag updating micro-operation execution is not delayed by using the last flag as a required source operand in certain embodiments. For example, such that single-pass execution is utilized, and the partial flag updating micro-operation is executed without special handling. In certain embodiments when (i) or (ii) are not satisfied, double-pass execution is utilized. In certain embodiments, double-pass execution or single-pass execution are indicated for a single reservation station entry, e.g., a partial flag updating micro-operation is occupying one reservation entry for single-pass mode or double-pass mode.

In certain embodiments, on the first pass, a partial flag updating micro-operation is dispatched from reservation station to compute data result once all sources, except last flag source, are ready (e.g., the data source operand is ready). Such action effectively allows a (e.g., INC/DEC) data result to satisfy a micro-operation dependent on that (e.g., INC/DEC) data result without false dependence on the last flag source register in certain embodiments. In certain embodiments, the partial flag updating micro-operation (e.g., INC/DEC) is not deallocated from reservation station after first pass dispatch. In certain embodiments, on a second pass, that partial flag updating micro-operation is dispatched again from same RS entry to compute flag result once all sources, including last flag source, are ready (e.g., INC/DEC data source operand and last flag source operand are ready). In certain embodiments, the partial flag updating micro-operation is then deallocated from reservation station after second pass dispatch. Note that both passes are dispatched from the same single RS entry in certain embodiments.

In certain embodiments the single-pass and double-pass execution is decided at reservation station insertion (e.g., as the very last in-order point of the pipeline) so that the most updated execution status of old flag source is used to maximize probability of single-pass execution.

Figure 5:
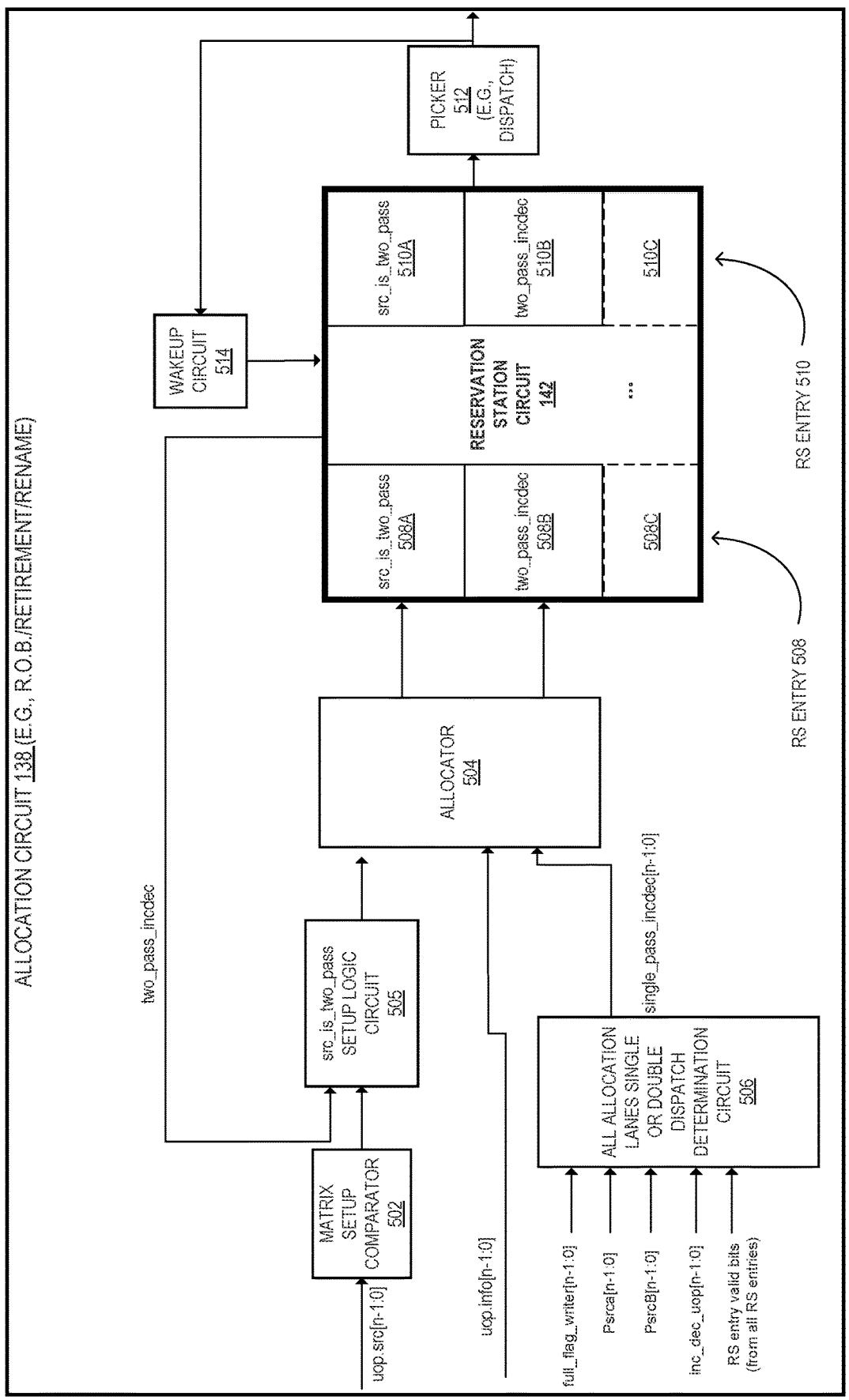
FIG. 5 illustrates an allocation circuit comprising an all allocation lanes single or double dispatch determination circuit and a reservation station circuit to implement dynamic two-pass execution of a partial flag register updating instruction according to embodiments of the disclosure.

FIG. 5 illustrates an allocation circuit 138 (e.g., having n lanes that are indexed as 0 to n−1 lanes, i.e., [n−1:0]) comprising an all allocation lanes single or double dispatch determination circuit 506 and a reservation station circuit 142 to implement dynamic two-pass execution of a partial flag register updating instruction according to embodiments of the disclosure. In certain embodiments, allocation circuit 138, e.g., in response to detecting (e.g., via its opcode) a partial flag register updating instruction (e.g., micro-operation) is to cause creation (e.g., population) of a corresponding entry (e.g., 508 or 510, although more than two entries may be includes) in reservation station circuit 142. In certain embodiments, all allocation lanes single or double dispatch determination circuit 506 is to setup each entry, e.g., and populate one or more fields of each entry. For example, with reservation station (RS) entry 508 for a micro-operation including a first field 508A (e.g., an indicator bit therein) (e.g., src_is_two_pass) that indicates if a source operand of the micro-operation (e.g., including a partial flag register updating micro-operation) is from a two-pass execution of a source micro-operation (e.g., where a first value (e.g., zero) in the first field 508A indicates a single dispatch read (e.g., micro-operation—including single dispatch partial flag writer micro-operation, full-flag writer micro-operation, no flags updating micro-operation, etc.) and a second, different value (e.g., one) in the first field 508A indicates a double dispatch read (e.g., a multiple pass mode)), a second field 508B (e.g., an indicator bit therein) (e.g., two_pass_incdec) that indicates if the partial flag register updating micro-operation is to be a single dispatch or a double dispatch (e.g., where a first value (e.g., zero) in the second field 508B indicates a single dispatch and a second, different value (e.g., one) in the second field 508B indicates a double dispatch), and a third field 508C to include other reservation station entry information, for example, a value that indicates a location of the source data operand(s). In one embodiment, third field 508C includes micro-operation information (e.g., uop.info).

For example, with reservation station (RS) entry 510 for a micro-operation including a first field 510A (e.g., an indicator bit therein) that indicates if a source operand of the micro-operation is from a two-pass execution of a source micro-operation (e.g., where a first value (e.g., zero) in the first field 510A indicates a single dispatch read (e.g. micro-operation—including single dispatch partial flag writer micro-operation, full-flag writer micro-operation, no flags updating micro-operation, etc.) and a second, different value (e.g., one) in the first field 510A indicates a double dispatch read (e.g., a multiple pass mode)), a second field 510B (e.g., an indicator bit therein) that indicates if the partial flag register updating micro-operation is to be a single dispatch or a double dispatch (e.g., where a first value (e.g., zero) in the second field 510B indicates a single dispatch and a second, different value (e.g., one) in the second field 510B indicates a double dispatch), and a third field 510C to include other reservation station entry information, for example, a value that indicates a location of the source data operand(s). In one embodiment, third field 510C includes micro-operation information (e.g., uop.info).

In certain embodiments, allocation circuit 138, in response to receiving a partial flag register updating instruction, sends source information (e.g., uop.src) to matrix setup comparator 502, e.g., to setup a dependence matrix that identifies dependencies of micro-operations, e.g., dependencies of the operands thereof. In one embodiment, n (e.g., in n−1) is the number of allocation lanes of allocation circuit 138, where n is any positive integer (e.g., allocation lanes 136 in FIG. 1). In certain embodiments, allocation circuit 138, in response to receiving a partial flag register updating instruction, sends other information (e.g., full_flag_writer, psrca, psrcb, inc_dec_uop, RS entry valids bits, etc.) as input to all allocation lanes single or double dispatch determination circuit 506, e.g., so it can populate fields 508C or 510C accordingly. In certain embodiments, src_is_two_pass setup logic circuit 505 is included to setup (e.g., initially populating during a uop allocation) fields 508A/510A (e.g., tracking bits). In one embodiment, src_is_two_pass setup logic circuit 505 determines (e.g., for a uop on each allocation lane) if the source of the current allocating uop is dependent on a partial flag updating uop or not, e.g., and (i) if not, sets that src_is_two_pass field (e.g., field 508A or field 510A) as zero, (ii) if yes, and the first pass of parent partial flag updating uop has not started executing, sets that src_is_two_pass field (e.g., field 508A or field 510A) as one, and (iii) if yes and the first pass of the parent partial flag updating uop has already started executing, sets that src_is_two_pass field (e.g., field 508A or field 510A) as zero.

In certain embodiments, an indication (e.g., single_pass_incdec) of whether the partial flag register updating instruction is to be a single pass execution or a double pass execution is provided as input to allocator 504 (e.g., from "all allocation lanes single or double dispatch determination" circuit 506), e.g., so allocator 504 can populate fields 508B or 510B accordingly. In certain embodiments, the indication (for example, single_pass_incdec, e.g., as an indication of single pass mode or double pass mode) of whether the partial flag register updating instruction is to be a single pass execution or a double pass execution is provided from a "single or double dispatch determination circuit", e.g., as discussed in reference to FIGS. 5-7.

In certain embodiments, the .src and .info belong to the same micro-operation bundle for each lane, e.g., where the .src (e.g., physical source register id) is used to setup the dependence matrix in matrix setup comparator 502 (e.g., to compare the producer physical destination register id (pdst_id) and consumer physical source register id (psrc_id)) and the .info (the remaining information from the micro-operation to pass down to the reservation station circuit 142 and execution). In one embodiment, the .src is separated from the rest of the bundle to use .src to setup the dependence matrix and the other .info (e.g., destination physical register id (pdst_id), opcode, port binding information, etc.) is written into a reservation station entry, e.g., along with an indication (e.g., src_is_two_pass) if a source operand of the micro-operation is from a second pass execution of a partial flag register updating source micro-operation and/or an indication (e.g., two_pass_incdec) if the partial flag register updating micro-operation is to be a single dispatch or a double dispatch.

In one embodiment, allocator 504 is to (1) determine if a flag source operand of a micro-operation depends on two-pass partial-flag updating parent micro-operation (e.g. INC/DEC), and (2) setup an initial state of "src_is_two_pass" tracking bits (e.g., 508A or 510A) correctly from current execution status of parent two-pass partial-flag updating micro-operation. In one embodiment, during insertion of a micro-operation in reservation station circuit 142 depending on a flag result from a two-pass partial-flag updating micro-operation in RS, "src_is_two_pass" is set to a one by allocator 504. However, in certain embodiments, the first pass dispatch of two-pass partial-flag updating parent micro-operation (e.g. INC/DEC) may have already happened, and the allocator 504 thus sets "src_is_two_pass" to zero even though the flag source operand depends on a two-pass partial-flag writer micro-operation.

Although "incdec" (e.g., increment/decrement) are used as example micro-operations, another micro-operation may be utilized, e.g., with that "incdec" verbiage replaced with another micro-operation or instruction name (e.g., mnemonic).

In certain embodiments (e.g., for populated. active entries), reservation station circuit monitors the indicated operands, etc., and then dispatches (e.g., via picker 512) a micro-operation once it is ready for execution (e.g., once its operands are available). In certain embodiments, wakeup circuit 514 detects a dispatch being sent and then updates one or more fields of reservation station circuit 142 accordingly. For example, to modify a field that indicates two-pass to instead indicate a single pass in response to a first dispatch.

In certain embodiments, allocation circuit 138, reservation circuit 142, and/or other components depicted herein cause the tagging of a (e.g., child) micro-operation dependent on a (e.g., parent) two-pass execution micro-operation in a reservation station (e.g., circuit).

In certain embodiments, a processor (e.g., including allocation circuit 138, reservation circuit 142, and/or other components depicted herein) causes a first-pass and second-pass dispatch from broadcast to wake up a dependent micro-operation (e.g., with same signature) since both passes broadcast from a same reservation station entry. Embodiments herein implement dynamic two-pass execution of a micro-operation to overcome this aliasing problem, for example, where a micro-operation depending on a data result from a two-pass partial flag updating micro-operation (e.g., INC/DEC) is setup to be waken up normally, e.g., on first broadcast and a micro-operation depending on a flag result from a two-pass partial flag updating micro-operation (e.g., INC/DEC) is setup to ignore first broadcast wakeup (e.g., during RS insertion).

Src_is_two_pass Tracker

In certain embodiments, when the source operand is from a two-pass partial flag updating micro-operation, an indicator bit (e.g., in Src_is_two_pass field 508A or 510A) is added to a (e.g., each corresponding) reservation station entry. In one embodiment, during matrix setup of a dependence matrix, along with src_is_two_pass setup logic circuit 505, it can be determined if a micro-operation flag source operand depends on a two-pass execution partial flag writer. If so, the source is tagged (e.g., by setting src_is_two_pass of corresponding flag source in RS entry to a first value) to ignore a first wakeup (e.g., dispatch) broadcast from a parent producer micro-operation (e.g., via a tracker in RS entry), e.g., where first broadcast carries a data result but not a flag result. In certain embodiments, Src_is_two_pass tracker handles speculative execution status of parent producer micro-operation (e.g., INC/DEC) correctly, e.g., which may cancel due to bad load dependence and reissue. For example, such that src_is_two_pass is set again to ignore reissue of first wakeup (e.g., dispatch) broadcast from parent producer micro-operation.

In certain embodiments, set up and consumption of src_is_two_pass indicator bit to support double dispatch does not degrade critical single cycle wakeup loop of (e.g., matrix_hit-ready-pick) scheduler loop, for example, where this indication is generated during allocation and is used to blocking logic (e.g., in wakeup circuit 514) to ignore the first wakeup broadcast, e.g., where that indicator bit is only cleared one cycle after the first wakeup broadcast.

Single-Pass and Two-Pass Execution

In certain embodiments, when the current micro-operation that is to be input into the reservation station is a two-pass partial flag updating micro-operation, an indicator bit (e.g., in two_pass_incdec field 508B or 510B) is added to a (e.g., each corresponding) reservation station entry.

Partial Flag Writer Micro-Operation Tagged as Single-Pass Execution

In certain embodiments, a partial flag writer micro-operation tagged (e.g., in two_pass_incdec field 508B or 510B) for single-pass execution is picked and dispatched to execution pipeline from a reservation station the same as a "regular" single micro-operation, e.g., once all its source dependence, including data and previous flag register source operands, are resolved.

Partial Flag Writer Micro-Operation Tagged as Double Pass Execution

In certain embodiments, a partial flag writer micro-operation tagged (e.g., in two_pass_incdec field 508B or 510B) for double-pass execution is picked and first (e.g., "first-pass") dispatched to an execution pipeline from a reservation station once all sources other than previous (for example, a previous version not yet updated by the current micro-operation) flag source are resolved (e.g., the data source operand is ready), and data resultant is computed without last flag(s) source. For example, such that first pass dispatch broadcasts the wakeup to dependent micro-operations at that time. In certain embodiments, this first broadcast wakes up child dependent micro-operations waiting for the partial flag writer producer micro-operation's (e.g., arithmetic or logic resultant) data (e.g., but not flag(s)). In certain embodiments, this first broadcast is ignored by child dependent micro-operations waiting for the partial flag writer producer micro-operation's flag since they are tagged (e.g., src_is_two_pass) to ignore first wakeup broadcast during RS insertion. In certain embodiments, the indicator bit (e.g., src_is_two_pass indication) is reset after the first broadcast and visible to the scheduler (e.g., picker 512) next cycle so that wakeup broadcast from second-pass is not ignored. In certain embodiments, the partial flag writer producer micro-operation is not deallocated from the reservation station after first dispatch, e.g., but is deallocated after the second (e.g., successful) dispatch.

In certain embodiments, for a second-pass dispatch, the partial flag writer micro-operation is picked again when all source operands including the previous (for example, a previous version not yet updated by the current micro-operation) flag source are resolved. In certain embodiments, once this flag result is computed, the second-pass dispatch broadcast wakes up the dependent partial flag writer micro-operation, e.g., and this second broadcast is ignored by child dependent micro-operation(s) dependent on the partial flag writer producer micro-operation's data since that has been already woken up by first-pass broadcast. In certain embodiments, child dependent micro-operation(s) waiting for the partial flag writer micro-operation's flag are woken up by the second-pass broadcast since they have already seen the first wakeup broadcast (e.g., src_is_two_pass is cleared). In certain embodiments, the partial flag writer micro-operation (e.g., its RS entry) is deallocated from the reservation station after this second-pass.

Examples of pseudocode that utilizes one or more partial flag writer instructions (e.g., corresponding micro-operation for each) are discussed below. For example, the below examples where RAX is a first data register, RBX is a second data register, RCX is a third data register, RDX is a fourth data register, and R8 is a fifth data register, SUB is a SUBtraction instruction that subtracts the value in RAX from the value in RBX and stores the resultant in RAX, INC is an INCrement by one instruction, CMOVNBE is a "Conditional MOVe if Not Below or Equal" instruction that checks flags for CF=0 and ZF=0 and moves the value from RDX to RCX if both CF=0 and ZF=0, CMP is a CoMPare instruction that compares the value from register RAX to the value in register R8 and sets the status flags in a (e.g., EFLAGS or RFLAGS) flag register according to the results, and JNE is a Jump if Not Equal instruction that jumps to the specified location if the Zero Flag (ZF) is cleared (e.g., it equals zero).

Example 1

SUB RAX, RBX
INC RAX
INC RAX
CMOVNBE RCX, RDX

In this example, both INC instructions above are determined to be single-pass (e.g., single cycle), for example, because both data and arithmetic flag results of INC can be computed during single-pass execution, e.g., such that CMOVNBE may start execution one cycle after second INC.

Example 2

SUB RAX, RBX
CMP RAX, R8
INC RAX
INC RAX
CMOVNBE RCX, RDX

In this example, both INC instructions above are determined to be double-pass, for example, because the flag source operand to first INC is available later than RAX result from SUB and the arithmetic flag result is computed at second-pass execution, e.g., such that CMOVNBE may start execution at least two cycles after execution of the second INC.

Example 3

SUB RAX, RBX
CMP RAX, R8
JNE label II Mispredicted→correct path is fall thorough
INC RAX
INC RAX
CMOVNBE RCX, RDX In this example, assuming INC from correct path after misprediction is allocated to reservation station after CMP has executed (e.g., therefore the arithmetic flag is ready), both INC instructions above are single-pass (e.g., single cycle) because both data and arithmetic flag results can be computed during single-pass execution, e.g., such that CMOVNBE may start execution the next cycle.

This example 3 (e.g., assembly sequence) illustrates that dynamic two-pass execution of a micro-operation therein requires no synchronization micro-operation (e.g., as in a sub-group flag renaming processor) is inserted before CMOVEBE (e.g., where a synchronization micro-operation is required for sub-group flag renaming processor because both CF and ZF are used by CMOVNBE). Thus, in certain embodiments, the CMOVNBE executes immediately after INC in, as opposed to a one or more cycle delay in a sub-group flag renaming processor.

Figure 6:
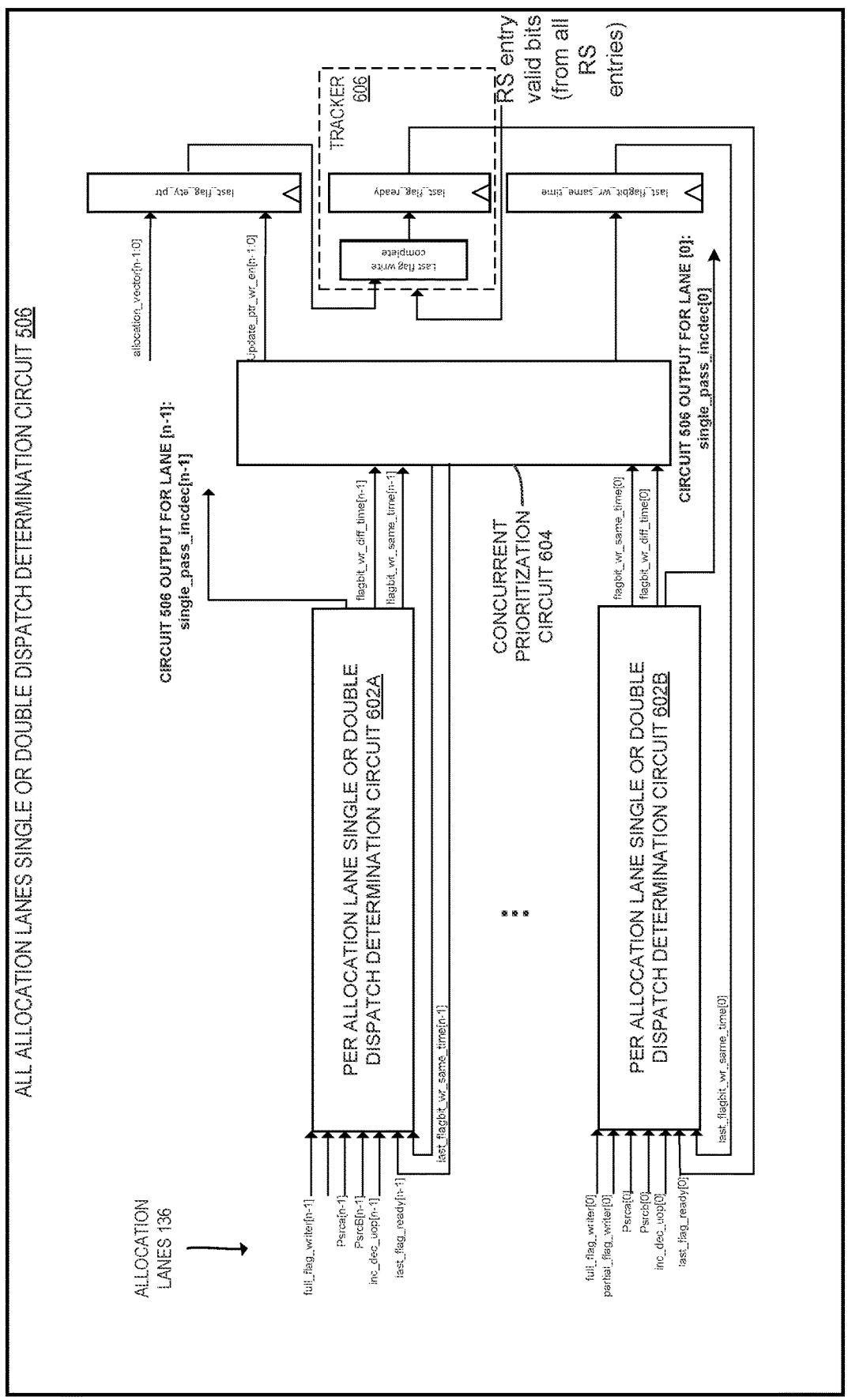
FIG. 6 illustrates an all allocation lanes single or double dispatch determination circuit comprising a plurality of per allocation lane single or double dispatch determination circuits according to embodiments of the disclosure.

FIG. 6 illustrates an all allocation lanes single or double dispatch determination circuit 506 comprising a plurality of per allocation lane single or double dispatch determination circuits 602A-602B according to embodiments of the disclosure. In certain embodiments, input information for a micro-operation (for example, from allocation lanes 136, e.g., one set of micro-operation information for each allocation lane) is received as input (e.g., in parallel) and used by a per allocation lane single or double dispatch determination circuit 602A-602B to determine (e.g., in parallel for each allocation lane) if the corresponding micro-operation is to be a single dispatch (e.g., single-pass) or a double dispatch (e.g., double-pass), e.g., for a single reservation station entry. Concurrent prioritization circuit 604 may then take this output information (e.g., including an indication if the flag(s) resultant and the data resultant were created (e.g., written (wr)) at the same time (e.g., flagbit_wr_same_time) or different times (e.g., flagbit_wr_diff_time). In certain embodiments, tracker 606 is included to track the status of the flags (e.g., if they have been updated such that the flag(s) is ready at allocation time).

In certain embodiments, all allocation lanes single or double dispatch determination circuit 506 includes a last flag writer tracker 606 and circuitry for partial flag updating micro-operation allocation and reservation station insertion. In certain embodiments, all allocation lanes single or double dispatch determination circuit 506 is to determine single-pass or two-pass execution during insertion into reservation station (RS).

In certain embodiments, all allocation lanes single or double dispatch determination circuit 506 may include a last flag writer tracker (e.g., last_flagbit_wr_same_time), last flag writer ready (e.g., last_flag_ready), and a pointer to RS entry (e.g., last_flag_ety_ptr) where last flag writer micro-operation is located in RS. When a flag updating micro-operation is allocated (e.g., in-order), the last flag writer tracker is updated in certain embodiments, e.g., the last flag writer tracker is updated to a first value (e.g., one) if the flag writer micro-operation updates all flag bits at the same time and the last flag writer tracker is updated to a second value (e.g., 0) if the flag writer micro-operation is a partial flag writer. In certain embodiment, the last_flag_ety_ptr is set to point to the RS entry occupied by the flag updating micro-operation and last_flag_ready indication is reset. In certain embodiments, the RS entry valid signal pointed to by last_flag_ety_ptr is monitored and once it transitions to invalid, and last_flag_ready is set to 1.

Figure 7:
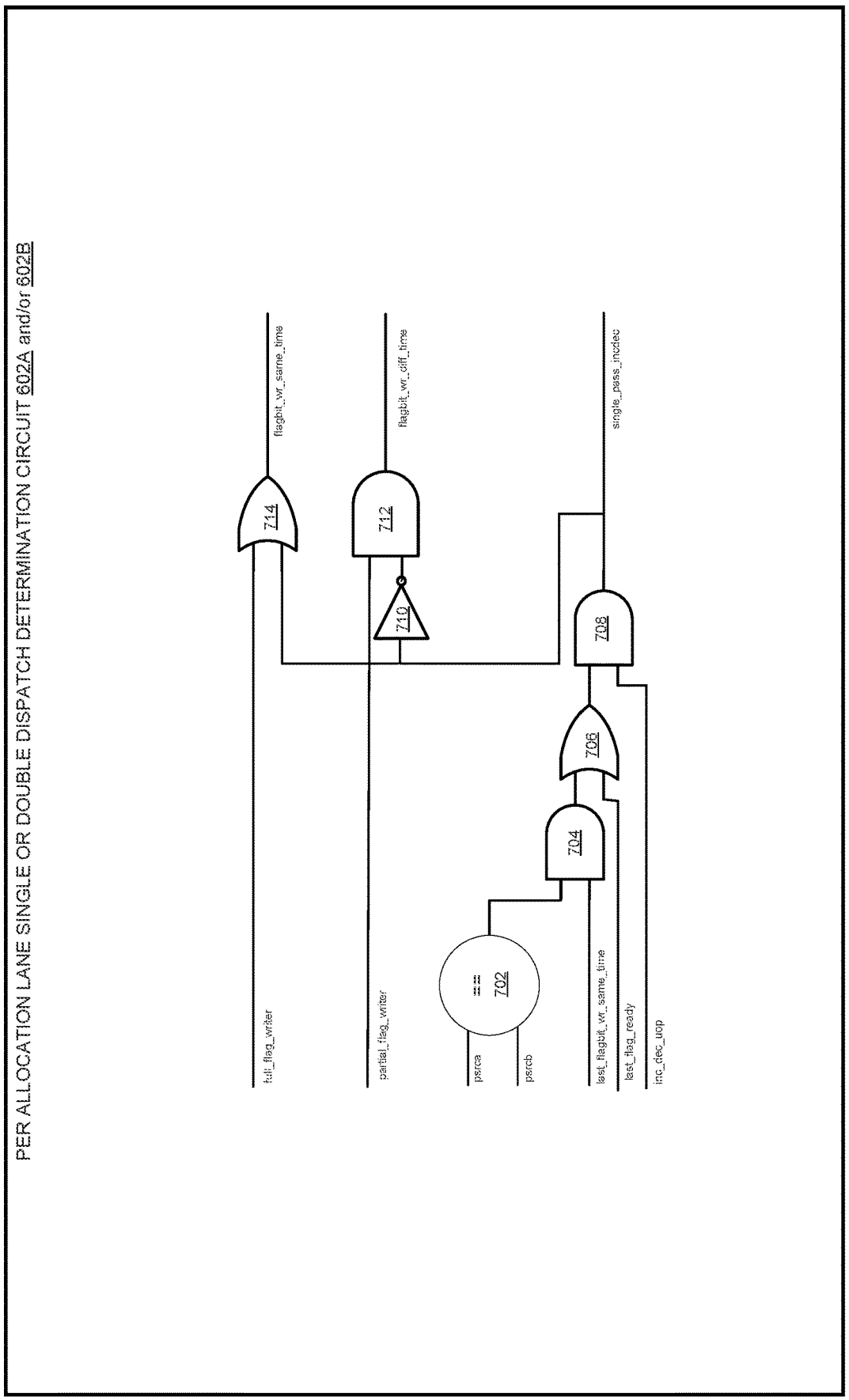
FIG. 7 illustrates a per allocation lane single or double dispatch determination circuit according to embodiments of the disclosure.

FIG. 7 illustrates a per allocation lane single or double dispatch determination circuit (e.g., as an instance of 602A and/or 602B in FIG. 6) according to embodiments of the disclosure. In certain embodiments, each dispatch determination circuit takes as inputs (e.g., from an allocation lane) one or more of the following: a full_flag_writer indication (e.g., full_flag_writer) for the incoming micro-operation, a partial flag writer indication (e.g., partial_flag_writer) for the incoming micro-operation, a first identification (ID) value (e.g., psrca) for a first (e.g., data) operand of the micro-operation (e.g., a register ID value), a second identification (ID) value for a second (e.g., flag) operand of the micro-operation (e.g., a register ID value), an indication (e.g., last_flagbit_wr_same_time) that first operand and the second operand (e.g., last flag) were created at the same time, an indication (e.g., last_flag_ready) that the last flag writer is ready, and/or an indication (e.g., inc_dec_uop) that the micro-operation (e.g., INC or DEC in this previous example in parenthesis) is a micro-operation that is eligible for double dispatch. Depicted comparator 702, NOT logic gate 710, AND logic gates 704, 708, and 712, and OR logic gates 706 and 714 are to produce the resulting outputs in certain embodiments. For example, the outputs an indication of single or double pass (e.g., single_pass_incdec) and an indication if the flag(s) resultant and the data resultant were created (e.g., written (wr)) at the same time (e.g., flagbit_wr_same_time) or different times (e.g., flagbit_wr_diff_time).

In certain embodiments (e.g., a per allocation lane basis from lane 0 to lane n), circuit 602A utilizes the logic below to determine whether a partial flag updating micro-operation should be tagged as single-pass execution or double-pass execution:
(i) the last flag source is ready as indicated by last_flag_ready for lane 0, e.g., younger lanes account for concurrent older lane flag writer in the same cycle, or
(ii) data source operand and flag source operand are produced by the same parent micro-operation, e.g., where two sources (e.g., flag and data source) have the same IDs (e.g., psrca is the same as psrcb) AND the parent producer is either a full_flag_writer or a single pass execution partial_flag_writer (e.g., last_flagbit_wr_same_time).

In certain embodiments, inc_dec_single_pass[x] is asserted if (i) or (ii) is true for allocation lane x. For example, such that inc_dec_single_pass[x]=1 indicates (e.g., INC/DEC) instruction at lane x should be tagged for single-pass execution. Certain embodiments herein thus cause an indicator bit (e.g., two_pass_incdec) to be added to the RS entry to tell RS to dispatch an entry for two passes and deallocate that entry only after two-pass dispatch completes.

FIG. 8 is a flow diagram illustrating operations 800 for dynamic two-pass execution of a (e.g., partial flag register updating) single micro-operation according to embodiments of the disclosure. Some or all of the operations 800 (or other processes described herein, or variations, and/or combinations thereof) are performed under the control of an allocation circuit (e.g., or reservation station circuit).

The operations 800 include, at block 802, decoding instructions into a set of one or more micro-operations by a decoder circuit of a processor comprising an execution circuit and a flag register to store a plurality of flags. The operations 800 further include, at block 804, setting an indicator bit to a multiple pass mode for a single micro-operation in a reservation station entry of a reservation station circuit coupled between the decoder circuit and the execution circuit. The operations 800 further include, at block 806, in response to the indicator bit being set to the multiple pass mode for the single micro-operation in the reservation station entry, performing a first dispatch of the single micro-operation to the execution circuit from the reservation station circuit, when a source data operand is ready for execution and a source flag operand in the flag register is not ready for execution, to generate a data resultant, and a second dispatch of the single micro-operation to the execution circuit when the source flag operand in the flag register is ready for execution to generate a flag resultant based on one or more of the plurality of flags in the flag register.

Exemplary architectures, systems, etc. that the above may be used in are detailed below.

At least some embodiments of the disclosed technologies can be described in view of the following examples:

Example 1. An apparatus comprising:
  a decoder circuit to decode instructions into a set of one or more micro-operations;
  an execution circuit to execute the micro-operations decoded for the instructions;
  a data register to store data;
  a flag register to store a plurality of flags; and
  a reservation station circuit coupled between the decoder circuit and the execution circuit, the reservation station circuit to, in response to an indicator bit set to a multiple pass mode for a single micro-operation in a reservation station entry, perform a first dispatch of the single micro-operation to the execution circuit, when a source data operand in the data register is ready for execution and a source flag operand in the flag register is not ready for execution, to generate a data resultant, and a second dispatch of the single micro-operation to the execution circuit when both the source data operand in the data register and the source flag operand in the flag register are ready for execution to generate a flag resultant based on one or more of the plurality of flags in the flag register.

Example 2. The apparatus of example 1, wherein execution of the single micro-operation by the execution circuit for the second dispatch is to cause a write of the flag resultant to the flag register without an overwrite of at least one of the plurality of flags in the flag register (e.g., by merging unmodified flags from last flag register with modified flags from current micro-operation).

Example 3. The apparatus of example 1, wherein the first dispatch is to cause a ready indication to be sent to a second reservation station entry for a second micro-operation, dependent on the data resultant and the flag resultant of the single micro-operation, when the data resultant is generated.

Example 4. The apparatus of example 3, wherein the reservation station circuit is to, when an indicator bit is set to a multiple pass mode for the second micro-operation, not dispatch the second micro-operation to the execution circuit in response to the ready indication.

Example 5. The apparatus of example 4, wherein the second dispatch is to cause a second ready indication to be sent to the second reservation station entry for the second micro-operation when the flag resultant is generated, and the reservation station circuit is to dispatch the second micro-operation to the execution circuit in response to the second ready indication.

Example 6. The apparatus of example 1, wherein the reservation station circuit is to, in response to the indicator bit set to the multiple pass mode for the single micro-operation in the reservation station entry, not deallocate the reservation station entry for the single micro-operation from the reservation station circuit in response to the first dispatch.

Example 7. The apparatus of example 6, wherein the reservation station circuit is to, in response to the indicator bit set to the multiple pass mode for the single micro-operation in the reservation station entry, deallocate the reservation station entry for the single micro-operation from the reservation station circuit in response to the second dispatch.

Example 8. The apparatus of example 1, wherein the reservation station entry comprises the indicator bit to indicate the multiple pass mode when a first value and a single pass mode (e.g., indicating it is not a partial-flag updating micro-operation) when a second value, and the reservation station circuit is to, in response to the indicator bit set to the single pass mode for the single micro-operation in the reservation station entry, perform a single dispatch of the single micro-operation to the execution circuit when the source data operand in the data register and the source flag operand in the flag register are ready for execution to generate a data and flag resultant.

Example 9. A method comprising:
decoding instructions into a set of one or more micro-operations by a decoder circuit of a processor comprising an execution circuit and a flag register to store a plurality of flags;
setting an indicator bit to a multiple pass mode for a single micro-operation in a reservation station entry of a reservation station circuit coupled between the decoder circuit and the execution circuit; and
in response to the indicator bit being set to the multiple pass mode for the single micro-operation in the reservation station entry, performing a first dispatch of the single micro-operation to the execution circuit from the reservation station circuit, when a source data operand is ready for execution and a source flag operand in the flag register is not ready for execution, to generate a data resultant, and a second dispatch of the single micro-operation to the execution circuit when both the source data operand in the data register and the source flag operand in the flag register are ready for execution to generate a flag resultant based on one or more of the plurality of flags in the flag register.

Example 10. The method of example 9, wherein executing the single micro-operation by the execution circuit for the second dispatch causes a write of the flag resultant to the flag register without an overwrite of at least one of the plurality of flags in the flag register (e.g., by merging unmodified flags from last flag register with modified flags from current micro-operation).

Example 11. The method of example 9, wherein the first dispatch causes sending of a ready indication to a second reservation station entry for a second micro-operation, dependent on the data resultant and the flag resultant of the single micro-operation, when the data resultant is generated.

Example 12. The method of example 11, further comprising not dispatching the second micro-operation to the execution circuit in response to the ready indication when an indicator bit is set to a multiple pass mode for the second micro-operation.

Example 13. The method of example 12, wherein the second dispatch causes a second ready indication to be sent to the second reservation station entry for the second micro-operation when the flag resultant is generated, and the reservation station circuit dispatches the second micro-operation to the execution circuit in response to the second ready indication.

Example 14. The method of example 9, further comprising not deallocating the reservation station entry for the single micro-operation from the reservation station circuit in response to the first dispatch when the indicator bit is set to the multiple pass mode for the single micro-operation in the reservation station entry.

Example 15. The method of example 14, further comprising deallocating the reservation station entry for the single micro-operation from the reservation station circuit in response to the second dispatch when the indicator bit is set to the multiple pass mode for the single micro-operation in the reservation station entry.

Example 16. The method of example 9, wherein the reservation station entry comprises the indicator bit to indicate the multiple pass mode when a first value and a single pass mode when a second value, and further comprising, in response to the indicator bit set to the single pass mode for the single micro-operation in the reservation station entry, performing a single dispatch of the single micro-operation to the execution circuit when the source data operand and the source flag operand in the flag register are ready for execution to generate a data and flag resultant.

Example 17. An apparatus comprising:
a decoder circuit to decode instructions into a set of one or more micro-operations;
an execution circuit to execute the micro-operations decoded for the instructions;
a flag register to store a plurality of flags; and
a reservation station circuit coupled between the decoder circuit and the execution circuit, the reservation station circuit to, in response to an indicator bit set to a multiple pass mode for a single micro-operation in a reservation station entry, perform a first dispatch of the single micro-operation to the execution circuit, when a source data operand is ready for execution and a source flag operand in the flag register is not ready for execution, to generate a data resultant, and a second dispatch of the single micro-operation to the execution circuit when both the source data operand in the data register and the source flag operand in the flag register are ready for execution to generate a flag resultant based on one or more of the plurality of flags in the flag register.

Example 18. The apparatus of example 17, wherein execution of the single micro-operation by the execution circuit for the second dispatch is to cause a write of the flag resultant to the flag register without an overwrite of at least one of the plurality of flags in the flag register (e.g., by merging unmodified flags from last flag register with modified flags from current micro-operation).

Example 19. The apparatus of example 17, wherein the first dispatch is to cause a ready indication to be sent to a second reservation station entry for a second micro-operation, dependent on the data resultant and the flag resultant of the single micro-operation, when the data resultant is generated.

Example 20. The apparatus of example 19, wherein the reservation station circuit is to, when an indicator bit is set to a multiple pass mode for the second micro-operation, not dispatch the second micro-operation to the execution circuit in response to the ready indication.

Example 21. The apparatus of example 20, wherein the second dispatch is to cause a second ready indication to be sent to the second reservation station entry for the second micro-operation when the flag resultant is generated, and the reservation station circuit is to dispatch the second micro-operation to the execution circuit in response to the second ready indication.

Example 22. The apparatus of example 17, wherein the reservation station circuit is to, in response to the indicator bit set to the multiple pass mode for the single micro-operation in the reservation station entry, not deallocate the reservation station entry for the single micro-operation from the reservation station circuit in response to the first dispatch.

Example 23. The apparatus of example 22, wherein the reservation station circuit is to, in response to the indicator bit set to the multiple pass mode for the single micro-operation in the reservation station entry, deallocate the reservation station entry for the single micro-operation from the reservation station circuit in response to the second dispatch.

Example 24. The apparatus of example 17, wherein the reservation station entry comprises the indicator bit to indicate the multiple pass mode when a first value and a single pass mode when a second value, and the reservation station circuit is to, in response to the indicator bit set to the single pass mode for the single micro-operation in the reservation station entry, perform a single dispatch of the single micro-operation to the execution circuit when the source data operand and the source flag operand in the flag register are ready for execution to generate a data and flag resultant.

In yet another embodiment, an apparatus comprises a data storage device that stores code that when executed by a hardware processor causes the hardware processor to perform any method disclosed herein. An apparatus may be as described in the detailed description. A method may be as described in the detailed description.

An instruction set may include one or more instruction formats. A given instruction format may define various fields (e.g., number of bits, location of bits) to specify, among other things, the operation to be performed (e.g., opcode) and the operand(s) on which that operation is to be performed and/or other data field(s) (e.g., mask). Some instruction formats are further broken down though the definition of instruction templates (or subformats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands. A set of SIMD extensions referred to as the Advanced Vector Extensions (AVX) (AVX1 and AVX2) and using the Vector Extensions (VEX) coding scheme has been released and/or published (e.g., see Intel® 64 and IA-32 Architectures Software Developer's Manual, November 2018; and see Intel® Architecture Instruction Set Extensions Programming Reference, October 2018).

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary graphics processors are described next. Followed by exemplary core architectures, and descriptions of exemplary processors and computer architectures.

Exemplary Core Architectures

In-Order and Out-of-Order Core Block Diagram

FIG. 9A is a block diagram illustrating both an exemplary in-order pipeline and an exemplary register renaming, out-of-order issue/execution pipeline according to embodiments of the disclosure. FIG. 9B is a block diagram illustrating both an exemplary embodiment of an in-order architecture core and an exemplary register renaming, out-of-order issue/execution architecture core to be included in a processor according to embodiments of the disclosure. The solid lined boxes in FIGS. 9A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 9A, a processor pipeline 900 includes a fetch stage 902, a length decode stage 904, a decode stage 906, an allocation stage 908, a renaming stage 910, a scheduling (also known as a dispatch or issue) stage 912, a register read/memory read stage 914, an execute stage 916, a write back/memory write stage 918, an exception handling stage 922, and a commit stage 924.

FIG. 9B shows processor core 990 including a front end unit 930 coupled to an execution engine unit 950, and both are coupled to a memory unit 970. The core 990 may be a reduced instruction set computing (RISC) core, a complex instruction set computing (CISC) core, a very long instruction word (VLIW) core, or a hybrid or alternative core type. As yet another option, the core 990 may be a special-purpose core, such as, for example, a network or communication core, compression engine, coprocessor core, general purpose computing graphics processing unit (GPGPU) core, graphics core, or the like.

The front end unit 930 includes a branch prediction unit 932 coupled to an instruction cache unit 934, which is coupled to an instruction translation lookaside buffer (TLB) 936, which is coupled to an instruction fetch unit 938, which is coupled to a decode unit 940. The decode unit 940 (or decoder or decoder unit) may decode instructions (e.g., macro-instructions), and generate as an output one or more micro-operations, micro-code entry points, micro-instructions, other instructions, or other control signals, which are decoded from, or which otherwise reflect, or are derived from, the original instructions. The decode unit 940 may be implemented using various different mechanisms. Examples of suitable mechanisms include, but are not limited to, look-up tables, hardware implementations, programmable logic arrays (PLAs), microcode read only memories (ROMs), etc. In one embodiment, the core 990 includes a microcode ROM or other medium that stores microcode for certain macro-instructions (e.g., in decode unit 940 or otherwise within the front end unit 930). The decode unit 940 is coupled to a rename/allocator unit 952 in the execution engine unit 950.

The execution engine unit 950 includes the rename/allocator unit 952 coupled to a retirement unit 954 and a set of one or more scheduler unit(s) 956. The scheduler unit(s) 956 represents any number of different schedulers, including reservations stations, central instruction window, etc. The scheduler unit(s) 956 is coupled to the physical register file(s) unit(s) 958. Each of the physical register file(s) units 958 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 958 comprises a vector registers unit, a write mask registers unit, and a scalar registers unit. These register units may provide architectural vector registers, vector mask registers, and general purpose registers. The physical register file(s) unit(s) 958 is overlapped by the retirement unit 954 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 954 and the physical register file(s) unit(s) 958 are coupled to the execution cluster(s) 960. The execution cluster(s) 960 includes a set of one or more execution units 962 and a set of one or more memory access units 964. The execution units 962 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 956, physical register file(s) unit(s) 958, and execution cluster(s) 960 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 964). It should also be understood that where separate pipelines are used, one or more of these pipelines may be out-of-order issue/execution and the rest in-order.

The set of memory access units 964 is coupled to the memory unit 970, which includes a data TLB unit 972 coupled to a data cache unit 974 coupled to a level 2 (L2) cache unit 976. In one exemplary embodiment, the memory access units 964 may include a load unit, a store address unit, and a store data unit, each of which is coupled to the data TLB unit 972 in the memory unit 970. The instruction cache unit 934 is further coupled to a level 2 (L2) cache unit 976 in the memory unit 970. The L2 cache unit 976 is coupled to one or more other levels of cache and eventually to a (e.g., main) memory 980.

By way of example, the exemplary register renaming, out-of-order issue/execution core architecture may implement the pipeline 900 as follows: 1) the instruction fetch 938 performs the fetch and length decoding stages 902 and 904; 2) the decode unit 940 performs the decode stage 906; 3) the rename/allocator unit 952 performs the allocation stage 908 and renaming stage 910; 4) the scheduler unit(s) 956 performs the schedule stage 912; 5) the physical register file(s) unit(s) 958 and the memory unit 970 perform the register read/memory read stage 914; the execution cluster 960 perform the execute stage 916; 6) the memory unit 970 and the physical register file(s) unit(s) 958 perform the write back/memory write stage 918; 7) various units may be involved in the exception handling stage 922; and 8) the retirement unit 954 and the physical register file(s) unit(s) 958 perform the commit stage 924.

The core 990 may support one or more instructions sets (e.g., the x86 instruction set (with some extensions that have been added with newer versions); the MIPS instruction set of MIPS Technologies of Sunnyvale, CA; the ARM instruction set (with optional additional extensions such as NEON) of ARM Holdings of Sunnyvale, CA), including the instruction(s) described herein. In one embodiment, the core 990 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyper-Threading technology).

While register renaming is described in the context of out-of-order execution, it should be understood that register renaming may be used in an in-order architecture. While the illustrated embodiment of the processor also includes separate instruction and data cache units 934/974 and a shared L2 cache unit 976, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-Order Core Architecture

Figure 10B:
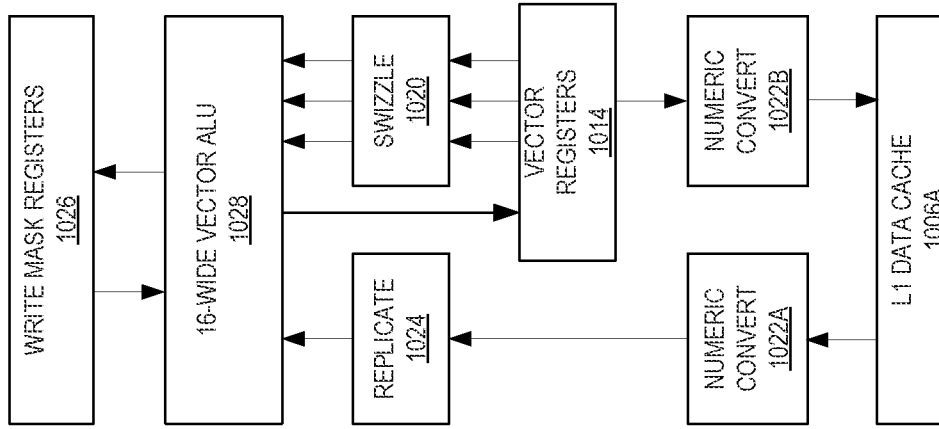
FIG. 10B is an expanded view of part of the processor core in FIG. 10A according to embodiments of the disclosure.
Figure 10A:
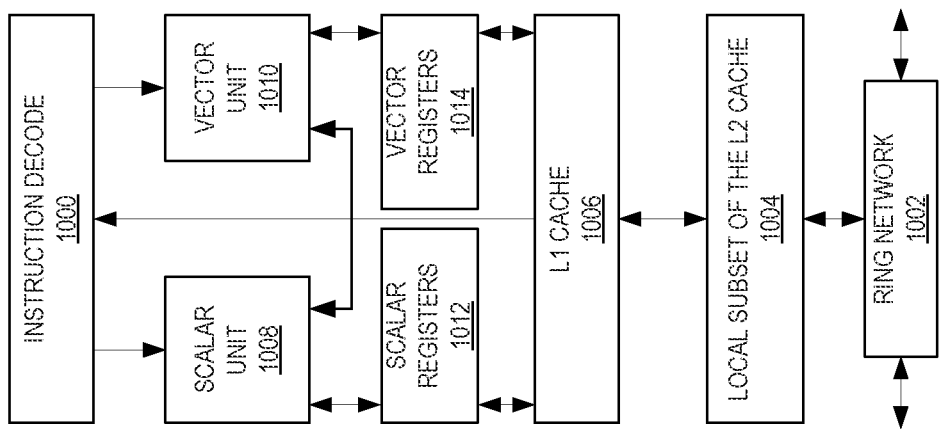
FIG. 10A is a block diagram of a single processor core, along with its connection to the on-die interconnect network and with its local subset of the Level 2 (L2) cache, according to embodiments of the disclosure.

FIGS. 10A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 10A is a block diagram of a single processor core, along with its connection to the on-die interconnect network 1002 and with its local subset of the Level 2 (L2) cache 1004, according to embodiments of the disclosure. In one embodiment, an instruction decode unit 1000 supports the x86 instruction set with a packed data instruction set extension. An L1 cache 1006 allows low-latency accesses to cache memory into the scalar and vector units. While in one embodiment (to simplify the design), a scalar unit 1008 and a vector unit 1010 use separate register sets (respectively, scalar registers 1012 and vector registers 1014) and data transferred between them is written to memory and then read back in from a level 1 (L1) cache 1006, alternative embodiments of the disclosure may use a different approach (e.g., use a single register set or include a communication path that allow data to be transferred between the two register files without being written and read back).

The local subset of the L2 cache 1004 is part of a global L2 cache that is divided into separate local subsets, one per processor core. Each processor core has a direct access path to its own local subset of the L2 cache 1004. Data read by a processor core is stored in its L2 cache subset 1004 and can be accessed quickly, in parallel with other processor cores accessing their own local L2 cache subsets. Data written by a processor core is stored in its own L2 cache subset 1004 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 10B is an expanded view of part of the processor core in FIG. 10A according to embodiments of the disclosure. FIG. 10B includes an L1 data cache 1006A part of the L1 cache 1004, as well as more detail regarding the vector unit 1010 and the vector registers 1014. Specifically, the vector unit 1010 is a 16-wide vector processing unit (VPU) (see the 16-wide ALU 1028), which executes one or more of integer, single-precision float, and double-precision float instructions. The VPU supports swizzling the register inputs with swizzle unit 1020, numeric conversion with numeric convert units 1022A-B, and replication with replication unit 1024 on the memory input. Write mask registers 1026 allow predicating resulting vector writes.

Figure 11:
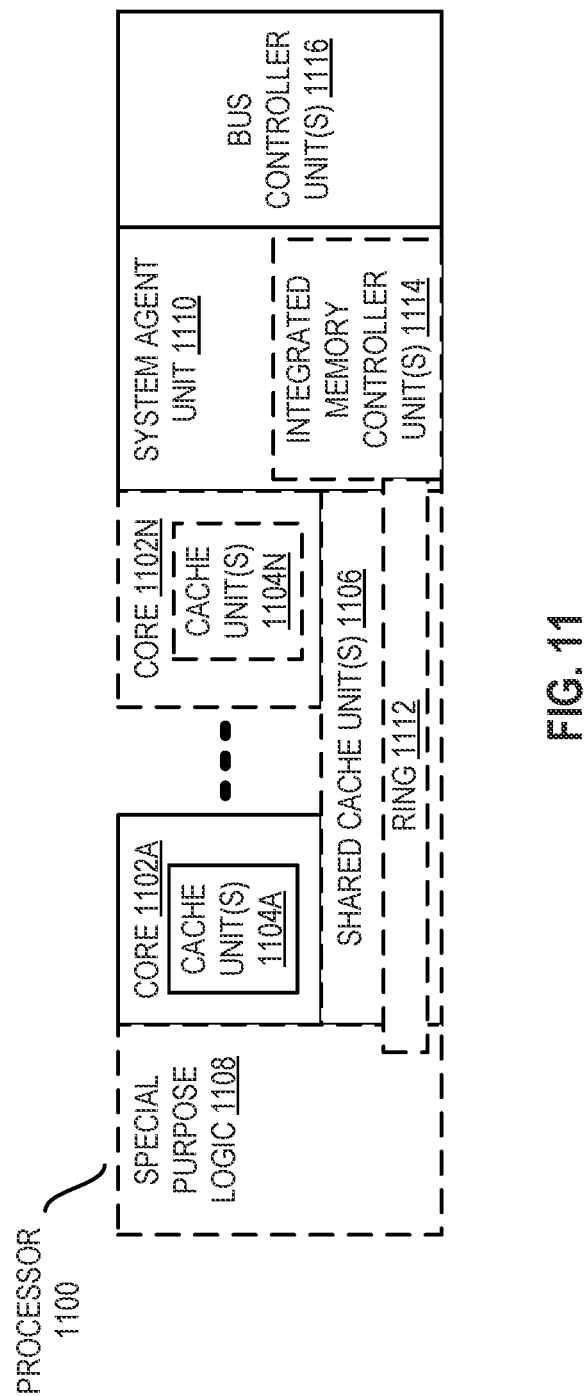
FIG. 11 is a block diagram of a processor that may have more than one core, may have an integrated memory controller, and may have integrated graphics according to embodiments of the disclosure.

FIG. 11 is a block diagram of a processor 1100 that may have more than one core, may have an integrated memory controller, and may have integrated graphics according to embodiments of the disclosure. The solid lined boxes in FIG. 11 illustrate a processor 1100 with a single core 1102A, a system agent 1110, a set of one or more bus controller units 1116, while the optional addition of the dashed lined boxes illustrates an alternative processor 1100 with multiple cores 1102A-N, a set of one or more integrated memory controller unit(s) 1114 in the system agent unit 1110, and special purpose logic 1108.

Thus, different implementations of the processor 1100 may include: 1) a CPU with the special purpose logic 1108 being integrated graphics and/or scientific (throughput) logic (which may include one or more cores), and the cores 1102A-N being one or more general purpose cores (e.g., general purpose in-order cores, general purpose out-of-order cores, a combination of the two); 2) a coprocessor with the cores 1102A-N being a large number of special purpose cores intended primarily for graphics and/or scientific (throughput); and 3) a coprocessor with the cores 1102A-N being a large number of general purpose in-order cores. Thus, the processor 1100 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1100 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 1106, and external memory (not shown) coupled to the set of integrated memory controller units 1114. The set of shared cache units 1106 may include one or more mid-level caches, such as level 2 (L2), level 3 (L3), level 4 (L4), or other levels of cache, a last level cache (LLC), and/or combinations thereof. While in one embodiment a ring based interconnect unit 1112 interconnects the integrated graphics logic 1108, the set of shared cache units 1106, and the system agent unit 1110/integrated memory controller unit(s) 1114, alternative embodiments may use any number of well-known techniques for interconnecting such units. In one embodiment, coherency is maintained between one or more cache units 1106 and cores 1102-A-N.

In some embodiments, one or more of the cores 1102A-N are capable of multi-threading. The system agent 1110 includes those components coordinating and operating cores 1102A-N. The system agent unit 1110 may include for example a power control unit (PCU) and a display unit. The PCU may be or include logic and components needed for regulating the power state of the cores 1102A-N and the integrated graphics logic 1108. The display unit is for driving one or more externally connected displays.

The cores 1102A-N may be homogenous or heterogeneous in terms of architecture instruction set; that is, two or more of the cores 1102A-N may be capable of execution the same instruction set, while others may be capable of executing only a subset of that instruction set or a different instruction set.

Exemplary Computer Architectures

FIGS. 12-15 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 12:
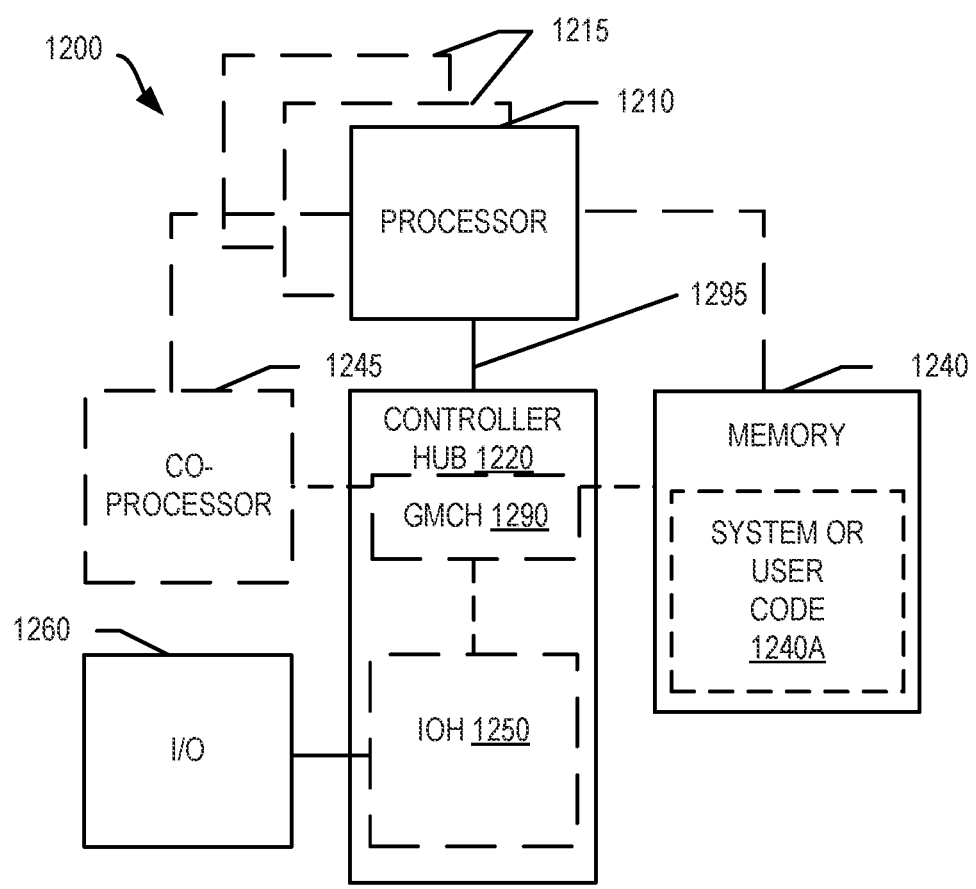
FIG. 12 is a block diagram of a system in accordance with one embodiment of the present disclosure.

Referring now to FIG. 12, shown is a block diagram of a system 1200 in accordance with one embodiment of the present disclosure. The system 1200 may include one or more processors 1210, 1215, which are coupled to a controller hub 1220. In one embodiment the controller hub 1220 includes a graphics memory controller hub (GMCH) 1290 and an Input/Output Hub (IOH) 1250 (which may be on separate chips); the GMCH 1290 includes memory and graphics controllers to which are coupled memory 1240 and a coprocessor 1245; the IOH 1250 is couples input/output (I/O) devices 1260 to the GMCH 1290. Alternatively, one or both of the memory and graphics controllers are integrated within the processor (as described herein), the memory 1240 and the coprocessor 1245 are coupled directly to the processor 1210, and the controller hub 1220 in a single chip with the IOH 1250. Memory 1240 may include system or user code 1240A, for example, that when executed causes a processor to perform any method of this disclosure.

The optional nature of additional processors 1215 is denoted in FIG. 12 with broken lines. Each processor 1210, 1215 may include one or more of the processing cores described herein and may be some version of the processor 1100.

The memory 1240 may be, for example, dynamic random access memory (DRAM), phase change memory (PCM), or a combination of the two. For at least one embodiment, the controller hub 1220 communicates with the processor(s) 1210, 1215 via a multi-drop bus, such as a frontside bus (FSB), point-to-point interface such as Quickpath Interconnect (QPI), or similar connection 1295.

In one embodiment, the coprocessor 1245 is a special-purpose processor, such as, for example, a high-throughput MIC processor, a network or communication processor, compression engine, graphics processor, GPGPU, embedded processor, or the like. In one embodiment, controller hub 1220 may include an integrated graphics accelerator.

There can be a variety of differences between the physical resources 1210, 1215 in terms of a spectrum of metrics of merit including architectural, microarchitectural, thermal, power consumption characteristics, and the like.

In one embodiment, the processor 1210 executes instructions that control data processing operations of a general type. Embedded within the instructions may be coprocessor instructions. The processor 1210 recognizes these coprocessor instructions as being of a type that should be executed by the attached coprocessor 1245. Accordingly, the processor 1210 issues these coprocessor instructions (or control signals representing coprocessor instructions) on a coprocessor bus or other interconnect, to coprocessor 1245. Coprocessor(s) 1245 accept and execute the received coprocessor instructions.

Figure 13:
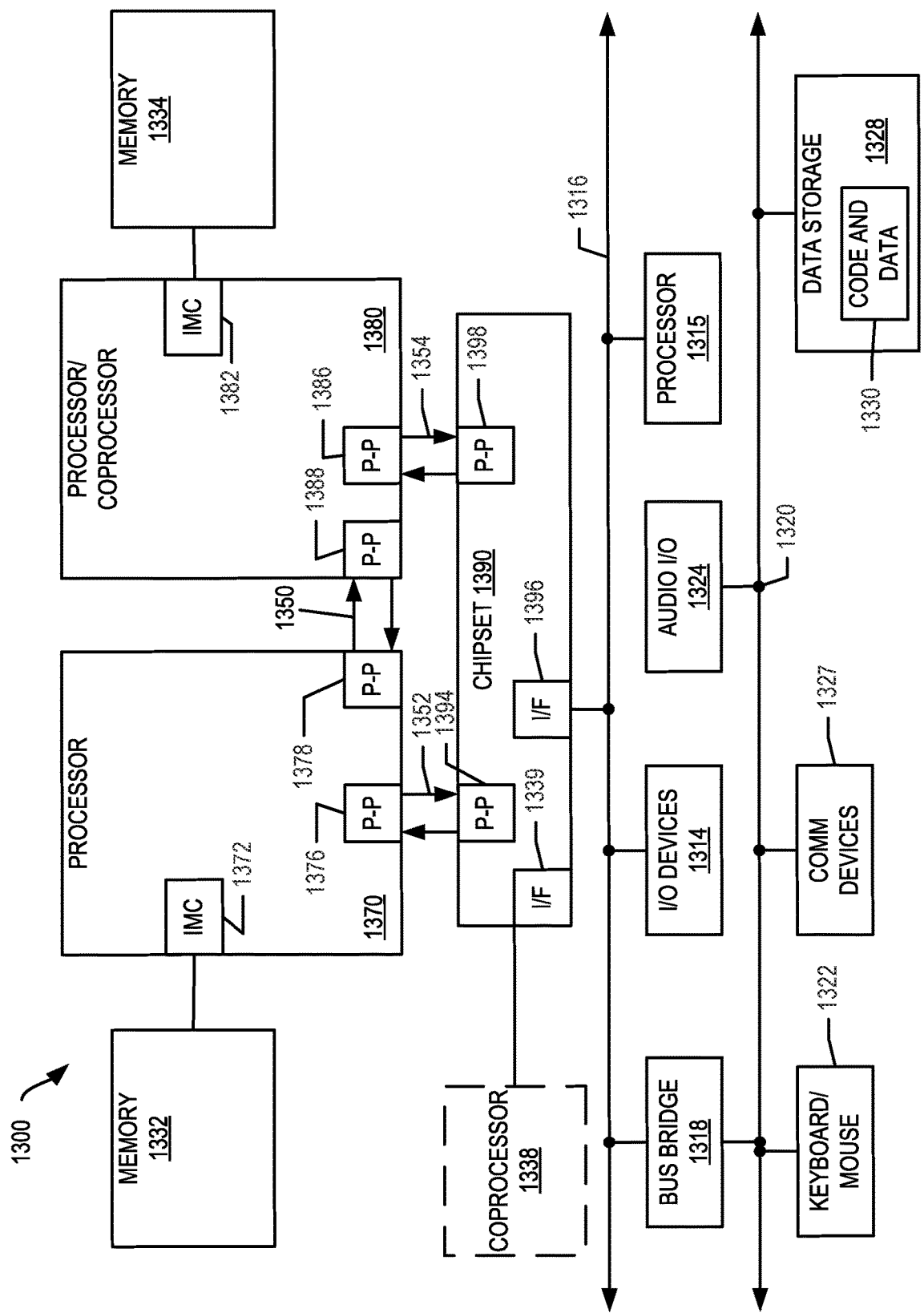
FIG. 13 is a block diagram of a more specific exemplary system in accordance with an embodiment of the present disclosure.

Referring now to FIG. 13, shown is a block diagram of a first more specific exemplary system 1300 in accordance with an embodiment of the present disclosure. As shown in FIG. 13, multiprocessor system 1300 is a point-to-point interconnect system, and includes a first processor 1370 and a second processor 1380 coupled via a point-to-point interconnect 1350. Each of processors 1370 and 1380 may be some version of the processor 1100. In one embodiment of the disclosure, processors 1370 and 1380 are respectively processors 1210 and 1215, while coprocessor 1338 is coprocessor 1245. In another embodiment, processors 1370 and 1380 are respectively processor 1210 coprocessor 1245.

Processors 1370 and 1380 are shown including integrated memory controller (IMC) units 1372 and 1382, respectively. Processor 1370 also includes as part of its bus controller units point-to-point (P-P) interfaces 1376 and 1378; similarly, second processor 1380 includes P-P interfaces 1386 and 1388. Processors 1370, 1380 may exchange information via a point-to-point (P-P) interface 1350 using P-P interface circuits 1378, 1388. As shown in FIG. 13, IMCs 1372 and 1382 couple the processors to respective memories, namely a memory 1332 and a memory 1334, which may be portions of main memory locally attached to the respective processors.

Processors 1370, 1380 may each exchange information with a chipset 1390 via individual P-P interfaces 1352, 1354 using point to point interface circuits 1376, 1394, 1386, 1398. Chipset 1390 may optionally exchange information with the coprocessor 1338 via a high-performance interface 1339. In one embodiment, the coprocessor 1338 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1390 may be coupled to a first bus 1316 via an interface 1396. In one embodiment, first bus 1316 may be a Peripheral Component Interconnect (PCI) bus, or a bus such as a PCI Express bus or another third generation I/O interconnect bus, although the scope of the present disclosure is not so limited.

As shown in FIG. 13, various I/O devices 1314 may be coupled to first bus 1316, along with a bus bridge 1318 which couples first bus 1316 to a second bus 1320. In one embodiment, one or more additional processor(s) 1315, such as coprocessors, high-throughput MIC processors, GPGPU's, accelerators (such as, e.g., graphics accelerators or digital signal processing (DSP) units), field programmable gate arrays, or any other processor, are coupled to first bus 1316. In one embodiment, second bus 1320 may be a low pin count (LPC) bus. Various devices may be coupled to a second bus 1320 including, for example, a keyboard and/or mouse 1322, communication devices 1327 and a storage unit 1328 such as a disk drive or other mass storage device which may include instructions/code and data 1330, in one embodiment. Further, an audio I/O 1324 may be coupled to the second bus 1320. Note that other architectures are possible. For example, instead of the point-to-point architecture of FIG. 13, a system may implement a multi-drop bus or other such architecture.

Figure 14:
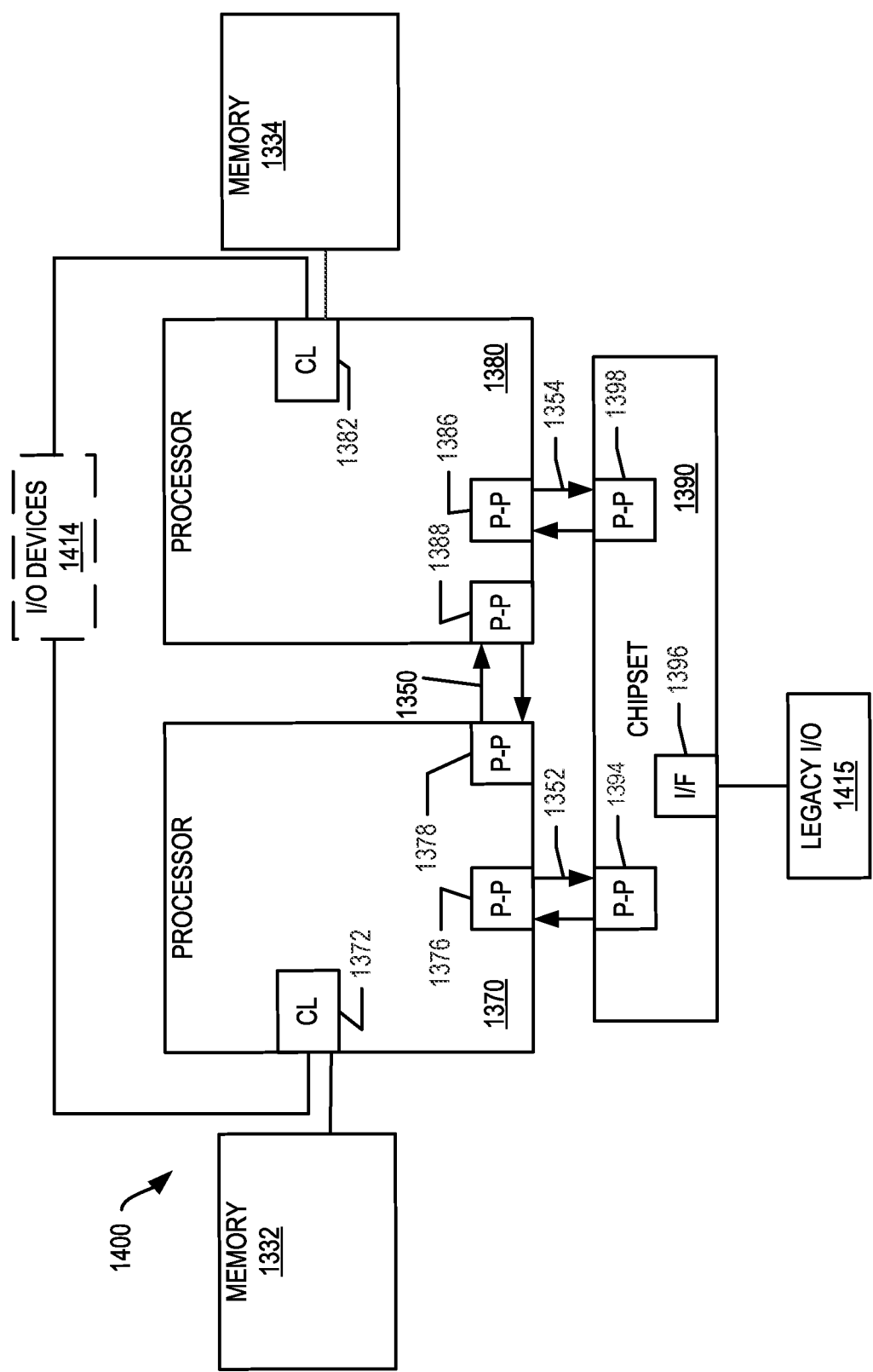
FIG. 14, shown is a block diagram of a second more specific exemplary system in accordance with an embodiment of the present disclosure.

Referring now to FIG. 14, shown is a block diagram of a second more specific exemplary system 1400 in accordance with an embodiment of the present disclosure. Like elements in FIGS. 13 and 14 bear like reference numerals, and certain aspects of FIG. 13 have been omitted from FIG. 14 in order to avoid obscuring other aspects of FIG. 14.

FIG. 14 illustrates that the processors 1370, 1380 may include integrated memory and I/O control logic ("CL") 1372 and 1382, respectively. Thus, the CL 1372, 1382 include integrated memory controller units and include I/O control logic. FIG. 14 illustrates that not only are the memories 1332, 1334 coupled to the CL 1372, 1382, but also that I/O devices 1414 are also coupled to the control logic 1372, 1382. Legacy I/O devices 1415 are coupled to the chipset 1390.

Figure 15:
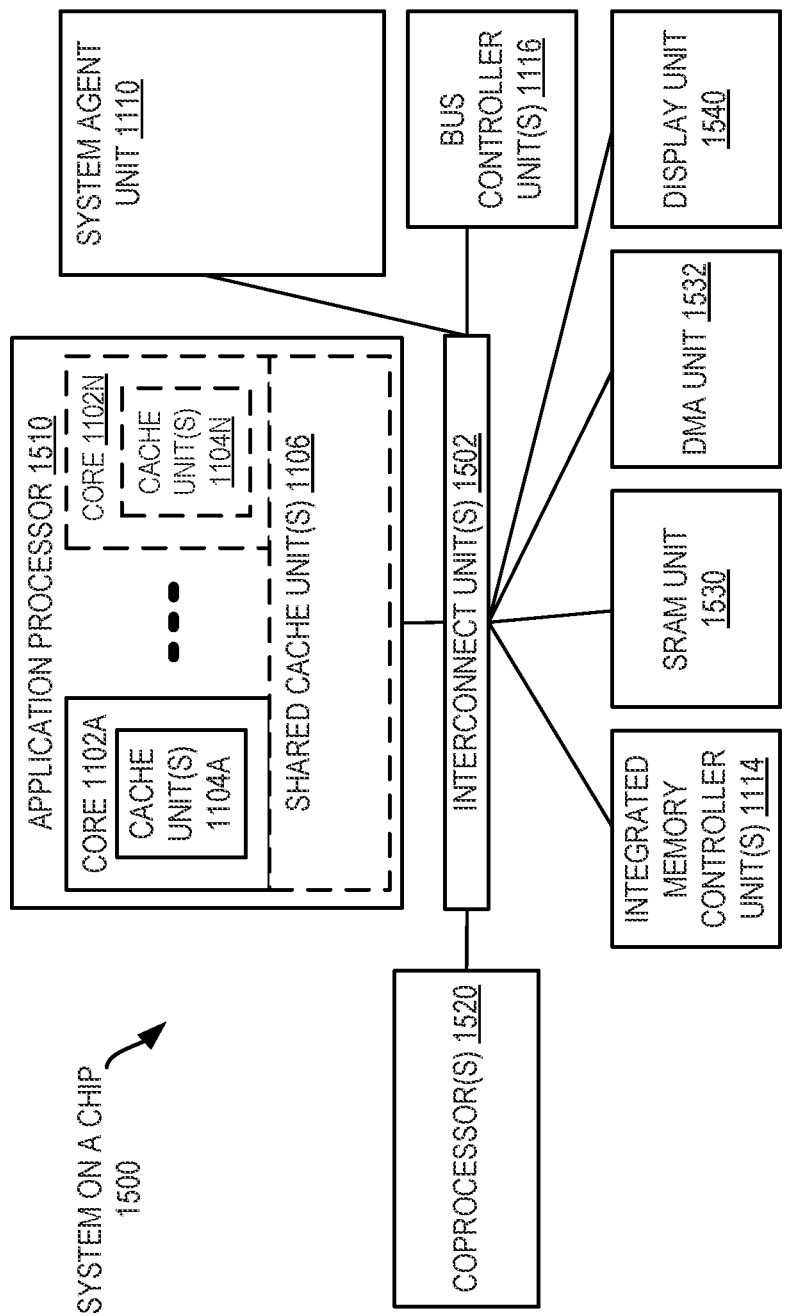
FIG. 15, shown is a block diagram of a system on a chip (SoC) in accordance with an embodiment of the present disclosure.

Referring now to FIG. 15, shown is a block diagram of a SoC 1500 in accordance with an embodiment of the present disclosure. Similar elements in FIG. 11 bear like reference numerals. Also, dashed lined boxes are optional features on more advanced SoCs. In FIG. 15, an interconnect unit(s) 1502 is coupled to: an application processor 1510 which includes a set of one or more cores 202A-N and shared cache unit(s) 1106; a system agent unit 1110; a bus controller unit(s) 1116; an integrated memory controller unit(s) 1114; a set or one or more coprocessors 1520 which may include integrated graphics logic, an image processor, an audio processor, and a video processor; an static random access memory (SRAM) unit 1530; a direct memory access (DMA) unit 1532; and a display unit 1540 for coupling to one or more external displays. In one embodiment, the coprocessor(s) 1520 include a special-purpose processor, such as, for example, a network or communication processor, compression engine, GPGPU, a high-throughput MIC processor, embedded processor, or the like.

Embodiments (e.g., of the mechanisms) disclosed herein may be implemented in hardware, software, firmware, or a combination of such implementation approaches. Embodiments of the disclosure may be implemented as computer programs or program code executing on programmable systems comprising at least one processor, a storage system (including volatile and non-volatile memory and/or storage elements), at least one input device, and at least one output device.

Program code, such as code 1330 illustrated in FIG. 13, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the disclosure also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 16:
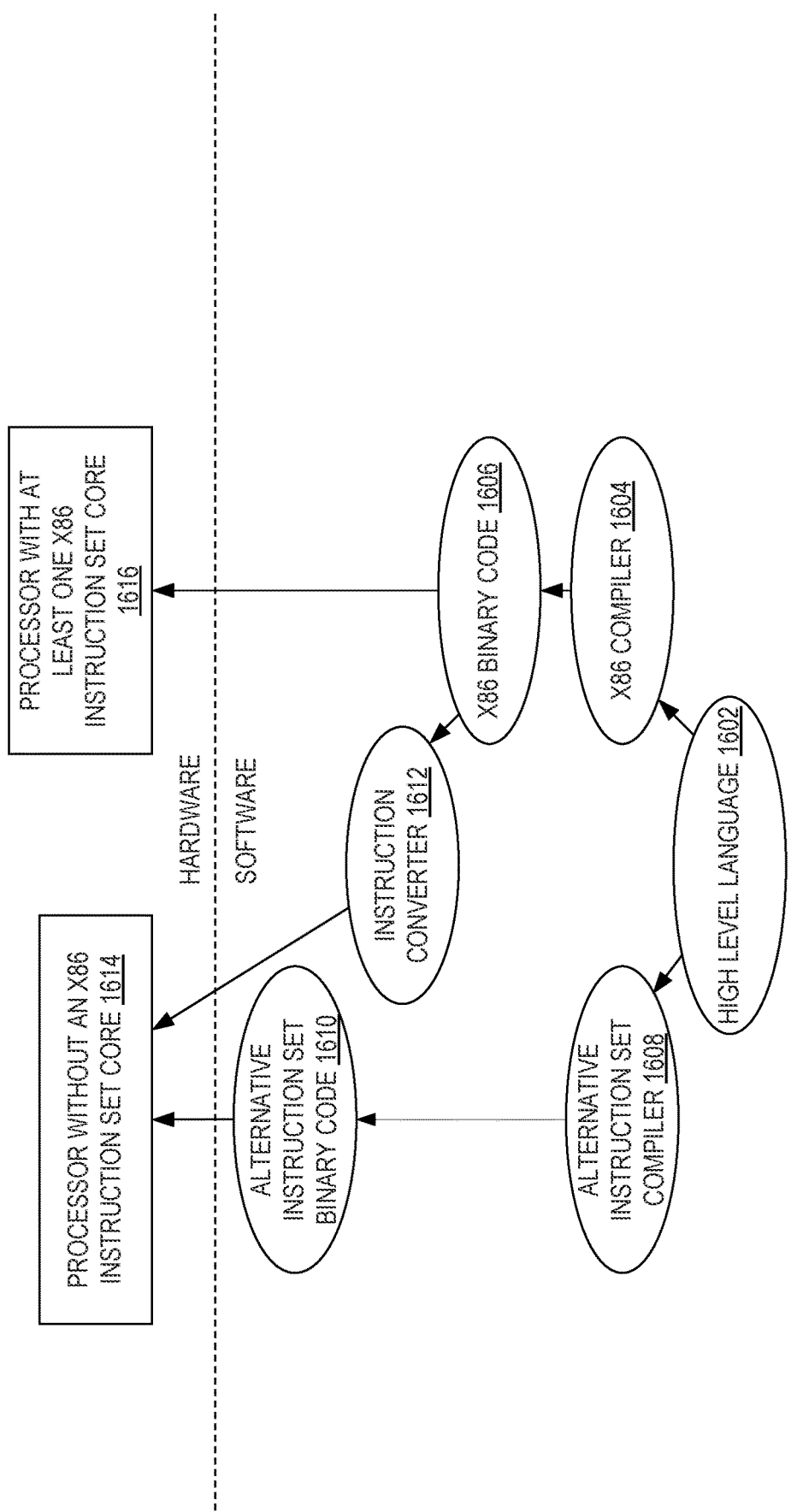
FIG. 16 is a block diagram contrasting the use of a software instruction converter to convert binary instructions in a source instruction set to binary instructions in a target instruction set according to embodiments of the disclosure.

FIG. 16 is a block diagram contrasting the use of a software instruction converter to convert binary instructions in a source instruction set to binary instructions in a target instruction set according to embodiments of the disclosure. In the illustrated embodiment, the instruction converter is a software instruction converter, although alternatively the instruction converter may be implemented in software, firmware, hardware, or various combinations thereof. FIG. 16 shows a program in a high level language 1602 may be compiled using an x86 compiler 1604 to generate x86 binary code 1606 that may be natively executed by a processor with at least one x86 instruction set core 1616. The processor with at least one x86 instruction set core 1616 represents any processor that can perform substantially the same functions as an Intel® processor with at least one x86 instruction set core by compatibly executing or otherwise processing (1) a substantial portion of the instruction set of the Intel® x86 instruction set core or (2) object code versions of applications or other software targeted to run on an Intel® processor with at least one x86 instruction set core, in order to achieve substantially the same result as an Intel® processor with at least one x86 instruction set core. The x86 compiler 1604 represents a compiler that is operable to generate x86 binary code 1606 (e.g., object code) that can, with or without additional linkage processing, be executed on the processor with at least one x86 instruction set core 1616. Similarly, FIG. 16 shows the program in the high level language 1602 may be compiled using an alternative instruction set compiler 1608 to generate alternative instruction set binary code 1610 that may be natively executed by a processor without at least one x86 instruction set core 1614 (e.g., a processor with cores that execute the MIPS instruction set of MIPS Technologies of Sunnyvale, CA and/or that execute the ARM instruction set of ARM Holdings of Sunnyvale, CA). The instruction converter 1612 is used to convert the x86 binary code 1606 into code that may be natively executed by the processor without an x86 instruction set core 1614. This converted code is not likely to be the same as the alternative instruction set binary code 1610 because an instruction converter capable of this is difficult to make; however, the converted code will accomplish the general operation and be made up of instructions from the alternative instruction set. Thus, the instruction converter 1612 represents software, firmware, hardware, or a combination thereof that, through emulation, simulation or any other process, allows a processor or other electronic device that does not have an x86 instruction set processor or core to execute the x86 binary code 1606.

What is claimed is:

1. An apparatus comprising:
   a decoder circuit to decode instructions into a set of one or more micro-operations;
   an execution circuit to execute the micro-operations decoded for the instructions;
   a data register to store data;
   a flag register to store a plurality of flags; and
   a reservation station circuit coupled between the decoder circuit and the execution circuit, the reservation station circuit to, in response to an indicator bit set to a multiple pass mode for a single micro-operation in a reservation station entry, perform a first dispatch of the single micro-operation to the execution circuit, when a source data operand in the data register is ready for execution and a source flag operand in the flag register is not ready for execution, to generate a data resultant, and a second dispatch of the single micro-operation to the execution circuit when both the source data operand in the data register and the source flag operand in the flag register are ready for execution to generate a flag resultant based on one or more of the plurality of flags in the flag register.

2. The apparatus of claim 1, wherein execution of the single micro-operation by the execution circuit for the second dispatch is to cause a write of the flag resultant to the flag register without an overwrite of at least one of the plurality of flags in the flag register.

3. The apparatus of claim 1, wherein the first dispatch is to cause a ready indication to be sent to a second reservation station entry for a second micro-operation, dependent on the data resultant and the flag resultant of the single micro-operation, when the data resultant is generated.

4. The apparatus of claim 3, wherein the reservation station circuit is to, when an indicator bit is set to a multiple pass mode for the second micro-operation, not dispatch the second micro-operation to the execution circuit in response to the ready indication.

5. The apparatus of claim 4, wherein the second dispatch is to cause a second ready indication to be sent to the second reservation station entry for the second micro-operation when the flag resultant is generated, and the reservation station circuit is to dispatch the second micro-operation to the execution circuit in response to the second ready indication.

6. The apparatus of claim 1, wherein the reservation station circuit is to, in response to the indicator bit set to the multiple pass mode for the single micro-operation in the reservation station entry, not deallocate the reservation station entry for the single micro-operation from the reservation station circuit in response to the first dispatch.

7. The apparatus of claim 6, wherein the reservation station circuit is to, in response to the indicator bit set to the multiple pass mode for the single micro-operation in the reservation station entry, deallocate the reservation station entry for the single micro-operation from the reservation station circuit in response to the second dispatch.

8. The apparatus of claim 1, wherein the reservation station entry comprises the indicator bit to indicate the multiple pass mode when a first value and a single pass mode when a second value, and the reservation station circuit is to, in response to the indicator bit set to the single pass mode for the single micro-operation in the reservation station entry, perform a single dispatch of the single micro-operation to the execution circuit when the source data operand in the data register and the source flag operand in the flag register are ready for execution to generate a data and flag resultant.

9. A method comprising:
   decoding instructions into a set of one or more micro-operations by a decoder circuit of a processor comprising an execution circuit and a flag register to store a plurality of flags;
   setting an indicator bit to a multiple pass mode for a single micro-operation in a reservation station entry of a reservation station circuit coupled between the decoder circuit and the execution circuit; and
   in response to the indicator bit being set to the multiple pass mode for the single micro-operation in the reservation station entry, performing a first dispatch of the single micro-operation to the execution circuit from the reservation station circuit, when a source data operand in a data register is ready for execution and a source flag operand in the flag register is not ready for execution, to generate a data resultant, and a second dispatch of the single micro-operation to the execution circuit when both the source data operand in the data register and the source flag operand in the flag register are ready for execution to generate a flag resultant based on one or more of the plurality of flags in the flag register.

10. The method of claim 9, wherein executing the single micro-operation by the execution circuit for the second dispatch causes a write of the flag resultant to the flag register without an overwrite of at least one of the plurality of flags in the flag register.

11. The method of claim 9, wherein the first dispatch causes sending of a ready indication to a second reservation station entry for a second micro-operation, dependent on the data resultant and the flag resultant of the single micro-operation, when the data resultant is generated.

12. The method of claim 11, further comprising not dispatching the second micro-operation to the execution circuit in response to the ready indication when an indicator bit is set to a multiple pass mode for the second micro-operation.

13. The method of claim 12, wherein the second dispatch causes a second ready indication to be sent to the second reservation station entry for the second micro-operation when the flag resultant is generated, and the reservation station circuit dispatches the second micro-operation to the execution circuit in response to the second ready indication.

14. The method of claim 9, further comprising not deallocating the reservation station entry for the single micro-operation from the reservation station circuit in response to the first dispatch when the indicator bit is set to the multiple pass mode for the single micro-operation in the reservation station entry.

15. The method of claim 14, further comprising deallocating the reservation station entry for the single micro-operation from the reservation station circuit in response to the second dispatch when the indicator bit is set to the multiple pass mode for the single micro-operation in the reservation station entry.

16. The method of claim 9, wherein the reservation station entry comprises the indicator bit to indicate the multiple pass mode when a first value and a single pass mode when a second value, and further comprising, in response to the indicator bit set to the single pass mode for the single micro-operation in the reservation station entry, performing a single dispatch of the single micro-operation to the execution circuit when the source data operand and the source flag operand in the flag register are ready for execution to generate a data and flag resultant.

17. An apparatus comprising:
a decoder circuit to decode instructions into a set of one or more micro-operations;
an execution circuit to execute the micro-operations decoded for the instructions;
a flag register to store a plurality of flags; and
a reservation station circuit coupled between the decoder circuit and the execution circuit, the reservation station circuit to, in response to an indicator bit set to a multiple pass mode for a single micro-operation in a reservation station entry, perform a first dispatch of the single micro-operation to the execution circuit, when a source data operand in a data register is ready for execution and a source flag operand in the flag register is not ready for execution, to generate a data resultant, and a second dispatch of the single micro-operation to the execution circuit when both the source data operand in the data register and the source flag operand in the flag register are ready for execution to generate a flag resultant based on one or more of the plurality of flags in the flag register.

18. The apparatus of claim 17, wherein execution of the single micro-operation by the execution circuit for the second dispatch is to cause a write of the flag resultant to the flag register without an overwrite of at least one of the plurality of flags in the flag register.

19. The apparatus of claim 17, wherein the first dispatch is to cause a ready indication to be sent to a second reservation station entry for a second micro-operation, dependent on the data resultant and the flag resultant of the single micro-operation, when the data resultant is generated.

20. The apparatus of claim 19, wherein the reservation station circuit is to, when an indicator bit is set to a multiple pass mode for the second micro-operation, not dispatch the second micro-operation to the execution circuit in response to the ready indication.

21. The apparatus of claim 20, wherein the second dispatch is to cause a second ready indication to be sent to the second reservation station entry for the second micro-operation when the flag resultant is generated, and the reservation station circuit is to dispatch the second micro-operation to the execution circuit in response to the second ready indication.

22. The apparatus of claim 17, wherein the reservation station circuit is to, in response to the indicator bit set to the multiple pass mode for the single micro-operation in the reservation station entry, not deallocate the reservation station entry for the single micro-operation from the reservation station circuit in response to the first dispatch.

23. The apparatus of claim 22, wherein the reservation station circuit is to, in response to the indicator bit set to the multiple pass mode for the single micro-operation in the reservation station entry, deallocate the reservation station entry for the single micro-operation from the reservation station circuit in response to the second dispatch.

24. The apparatus of claim 17, wherein the reservation station entry comprises the indicator bit to indicate the multiple pass mode when a first value and a single pass mode when a second value, and the reservation station circuit is to, in response to the indicator bit set to the single pass mode for the single micro-operation in the reservation station entry, perform a single dispatch of the single micro-operation to the execution circuit when the source data operand and the source flag operand in the flag register are ready for execution to generate a data and flag resultant.

* * * * *